(12) United States Patent
McKinlay et al.

(10) Patent No.: US 11,587,105 B2
(45) Date of Patent: *Feb. 21, 2023

(54) METHOD AND SYSTEM FOR CUSTOMIZING END USER GAMING EXPERIENCE

(71) Applicant: Formation, Inc., San Francisco, CA (US)

(72) Inventors: Chris McKinlay, San Francisco, CA (US); Greg Pfeil, Boulder, CO (US); Stas Goldobin, San Francisco, CA (US); Christian Selchau-Hansen, Menlo Park, CA (US)

(73) Assignee: Formation, Inc., San Francisco, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/793,509

(22) Filed: Feb. 18, 2020

(65) Prior Publication Data

US 2020/0265451 A1 Aug. 20, 2020

Related U.S. Application Data

(60) Provisional application No. 62/807,800, filed on Feb. 20, 2019.

(51) Int. Cl.
*G06Q 30/02* (2012.01)
*A63F 13/792* (2014.01)
(Continued)

(52) U.S. Cl.
CPC ....... *G06Q 30/0209* (2013.01); *A63F 13/792* (2014.09); *G06N 5/04* (2013.01); *G06N 20/00* (2019.01); *G06Q 30/0211* (2013.01)

(58) Field of Classification Search
USPC .......................................................... 463/25
See application file for complete search history.

(56) References Cited

U.S. PATENT DOCUMENTS

| | | | | |
|---|---|---|---|---|
| 2008/0076548 | A1* | 3/2008 | Paulsen | G07F 17/323 463/29 |
| 2009/0082105 | A1* | 3/2009 | Hegstrom | A63F 13/10 463/43 |

(Continued)

FOREIGN PATENT DOCUMENTS

| | | |
|---|---|---|
| JP | 2005-513584 | 5/2005 |
| JP | 2011-243143 | 12/2011 |

(Continued)

OTHER PUBLICATIONS

Möller, et al., "Gaming taxonomy: An overview of concepts and evaluation methods for computer gaming QoE," 2013 Fifth International Workshop on Quality of Multimedia Experience (QoMEX), Jul. 2013, pp. 236-241.

*Primary Examiner* — Pierre E Elisca
(74) *Attorney, Agent, or Firm* — DLA Piper LLP (US)

(57) ABSTRACT

A system for customizing an end user gaming experience is disclosed herein. The system includes a processor. The processor is configured to create a campaign by receiving a campaign creation request from an end user device, the campaign creation request comprising one or more parameters of a campaign associated with the campaign request, creating the campaign based on the one or more parameters associated with the campaign request, and personalizing one or more offers for an end user, each of the one or more offers comprising a game having one or more hurdles, wherein completion of each of the one or more hurdles leads to a reward. The processor is further configured to map a subset (Continued)

of the one or more personalized offers to the end user. The processor is further configured to monitor progress of the campaign.

20 Claims, 15 Drawing Sheets

(51) Int. Cl.
    *G06N 5/04*     (2006.01)
    *G06N 20/00*     (2019.01)
    *G06Q 30/0207*     (2023.01)
    *G06Q 30/0211*     (2023.01)

(56) References Cited

U.S. PATENT DOCUMENTS

| | | |
|---|---|---|
| 2011/0295722 A1 | 12/2011 | Reisman |
| 2012/0129586 A1* | 5/2012 | Lutnick .................. G07F 17/32 463/16 |
| 2012/0218172 A1 | 8/2012 | Border et al. |
| 2013/0325587 A1 | 12/2013 | Kothari et al. |
| 2014/0141866 A1* | 5/2014 | Irwin, Jr ................ G07F 17/329 463/25 |
| 2014/0180826 A1 | 6/2014 | Boal |
| 2016/0055499 A1 | 2/2016 | Hawkins et al. |
| 2016/0078484 A1 | 3/2016 | Emigh et al. |
| 2016/0171525 A1 | 6/2016 | Ezra et al. |
| 2016/0224951 A1 | 8/2016 | Hoffberg |
| 2017/0061736 A1* | 3/2017 | Lutnick .................. G07F 17/329 |
| 2017/0068983 A1 | 3/2017 | Rajan et al. |
| 2018/0060901 A1 | 3/2018 | Lyndon-James |
| 2019/0066139 A1* | 2/2019 | Lutnick ............... G07F 17/3255 |
| 2020/0027107 A1* | 1/2020 | Lutnick ................ G07F 17/323 |

FOREIGN PATENT DOCUMENTS

| | | |
|---|---|---|
| JP | 2014-121420 | 7/2014 |
| JP | 2014-529110 | 10/2014 |
| JP | 2016-76125 | 5/2016 |

* cited by examiner

| | | | | | | |
|---|---|---|---|---|---|---|
| METRICS CAMPAIGNS OFFERS | | | | | Thomas Crown | |
| Campaigns • 103 Campaigns | | | | Search | Create New Campaign | |
| ID ▾ | Campaign Name ▾ | Audience ▾ | Objective ▾ | Deployment Date ▾ | Expiration ▾ | Status ▾ |
| | | | | Created On<br>Created By<br>Last Modified On<br>Last Modified By<br>Deployment Date | | |
| c16 | New.Engagement.Scheduled | New | NIR | | -- | • Active |
| c16 | New.Engagement.Scheduled | New | NIR | | -- | • Active |
| c16 | New.Engagement.Scheduled | New | NIR | | -- | • Active |
| c16 | New.Engagement.Scheduled | New | NIR | 04.11.2018, 5:00 | -- | • Active |
| c16 | New.Engagement.Scheduled | New | NIR | 04.11.2018, 5:00 | -- | • Active |
| c16 | New.Engagement.Scheduled | New | NIR | 04.11.2018, 5:00 | -- | • Draft |
| c16 | New.Engagement.Scheduled | New | NIR | 04.11.2018, 5:00 | -- | • Draft |
| c16 | New.Engagement.Scheduled | New | NIR | 04.11.2018, 5:00 | -- | • Draft |
| c16 | New.Engagement.Scheduled | New | NIR | 04.11.2018, 5:00 | -- | • Draft |
| c16 | New.Engagement.Scheduled | New | NIR | 04.11.2018, 5:00 | -- | • Draft |

METRICS   CAMPAIGNS   OFFERS

Offers - 103 Offers

| Filters | Clear filters |
|---|---|
| ∨ Offer Type | |
| ☑ Product Quest | |
| ☐ Product Quest Scratcher | |
| ☐ Visit Dash | |
| ☐ Product Dash | |
| ☐ Bonus Visit Loop | |
| ☐ Bonus Star Pairing | |
| ∨ Duration | |
| Min   Max | |
| ∨ Hurdles | |
| ∨ Unique Variants | |
| ∨ Created | |
| ∨ Expiration | |
| ∨ Status | |

🔍 Search

| ID ▾ | Offer Name ▾ | Offer Type ▾ | Expiration ▾ | Status ▾ | |
|---|---|---|---|---|---|
| 760 | PQ.Easy.Med.SummerChill | Product Quest | 04.11.2018 | ● Active | ⋮ |
| 236 | PQ.Easy.Med.SummerChill | Product Quest | 04.11.2018 | ● Active | ⋮ |
| 855 | PQ.Easy.Med.SummerChill | Product Quest | 04.11.2018 | ● Active | ⋮ |
| 785 | PQ.Easy.Med.SummerChill | Product Quest | 04.11.2018 | ● Active | ⋮ |
| 449 | PQ.Easy.Med.SummerChill | Product Quest | 04.11.2018 | ● | Edit |
| 13 | PQ.Easy.Med.SummerChill | Product Quest | 04.11.2018 | ● Draft | ⋮ |
| 771 | PQ.Easy.Med.SummerChill | Product Quest | 04.11.2018 | ● Draft | ⋮ |
| 925 | PQ.Easy.Med.SummerChill | Product Quest | 04.11.2018 | ● Draft | ⋮ |
| 854 | PQ.Easy.Med.SummerChill | Product Quest | 04.11.2018 | ● Draft | ⋮ |
| 935 | PQ.Easy.Med.SummerChill | Product Quest | 04.11.2018 | ● Draft | ⋮ |
| 265 | PQ.Easy.Med.SummerChill | Product Quest | 04.11.2018 | ● Draft | ⋮ |

Thomas Crown ⊙ ▾

PQ.Easy.Med.SummerChill.P ✕
Q.Easy.Med.SummerChill.PQ
.Easy.Med.SummerChill

Channel(s):   Email, Mobile, Web
Offer Duration: 7 Days
Expiration:   04.11.2018

Flight Purchase
\# Expected quantity +2
$ 60% of expected spend per unit
★ Premier Qualifying Miles - 10%, 20%, 25% of incr. revenue Flight Purchase
\# Expected quantity +2
$ 60% of expected spend per unit
★ Premier Qualifying Miles - 10%, 20%, 25% of incr. revenue Bonus Reward
★ Miles - 20% of incr. revenue

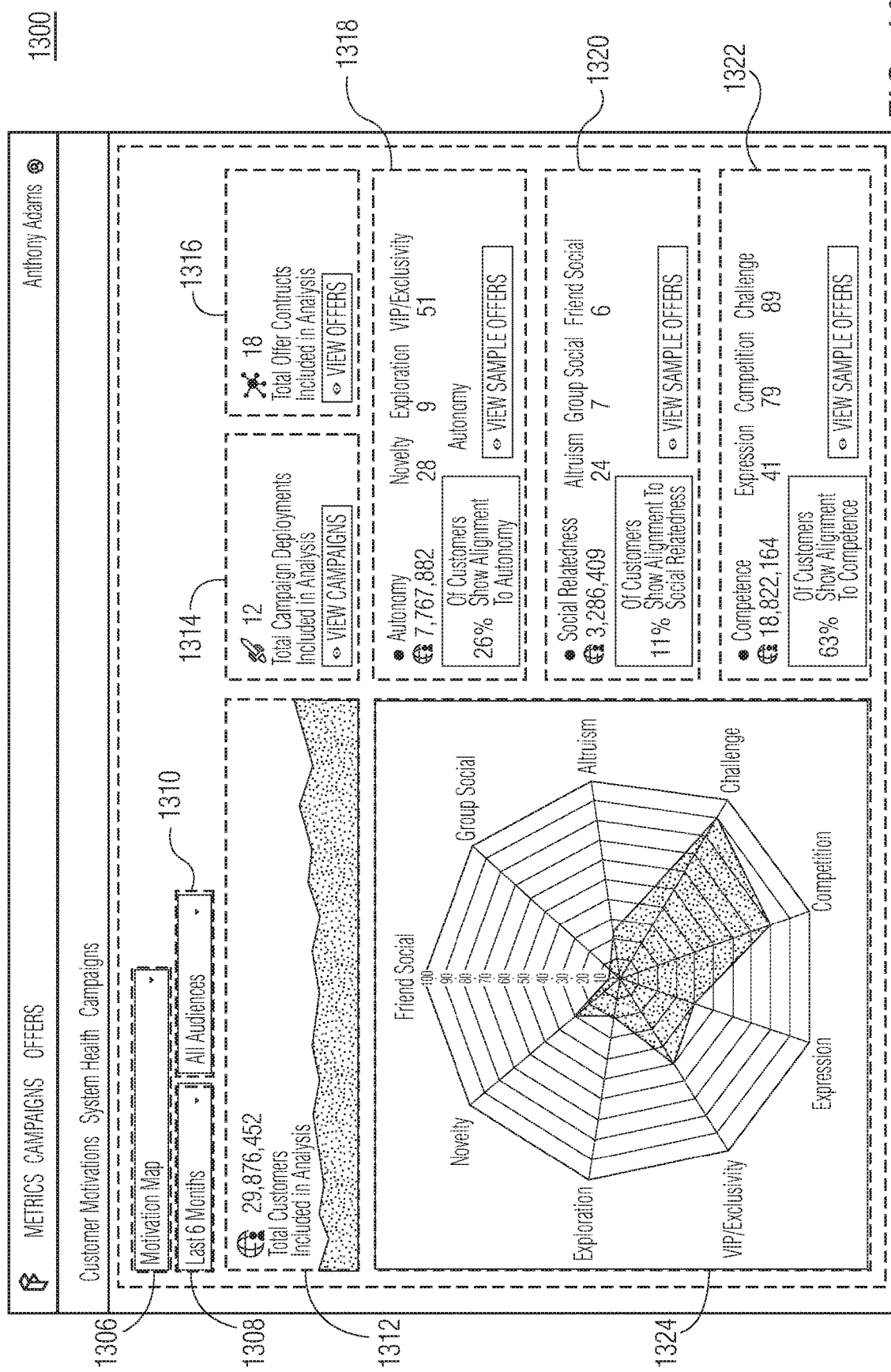

METHOD AND SYSTEM FOR CUSTOMIZING END USER GAMING EXPERIENCE

CROSS-REFERENCE TO RELATED APPLICATIONS

This application claims priority to U.S. Application Ser. No. 62/807,800, filed on Feb. 20, 2019, which is hereby incorporated by reference in its entirety.

FIELD OF THE DISCLOSURE

The present disclosure generally relates to a method and a system for customizing end user gaming experience.

BACKGROUND

As technology continuously improves, organizations increasingly rely on technological channels to engage customers and increase revenue. Such exemplary technological channels typically include electronic mail communications as well as mobile applications, through which customers can enroll in a loyalty program with the organization. Typically, customers may receive incentives to frequently transact at such organization through rewards or offerings from the organization. Conventional platforms, however, are simply unable to adapt such incentives to individual customers. Instead, conventional platforms issue a generic offering to all customers even though the means through which rewards or offerings may be achieved are not preferable for each customer.

SUMMARY

In some embodiments, a system for customizing an end user gaming experience is disclosed herein. The system includes a processor, an orchestration engine, a policy engine, and a workflow engine. The processor is in communication with a client computing system and one or more end user devices. The orchestration engine is configured to create a campaign. The orchestration engine receives a campaign creation request from an end user device. The campaign creation request includes one or more parameters of a campaign associated with the campaign request. The orchestration engine creates the campaign based on the one or more parameters associated with the campaign request. The policy engine is configured to personalize each of the one or more offers for each end user. The policy engine maps one or more personalized offers to an each end user. Each of the one or more offers includes a game having one or more hurdles. Completion of each of the one or more hurdles leads to a reward. The workflow engine is configured to monitor progress of the campaign. The workflow engine pushes the one or more personalized offers to each respective end user device. The workflow engine monitors each end user's progression in a respective game. The workflow engine updates each user's progression in the respective game.

In some embodiments, a method of customizing end user gaming experience is disclosed herein. An organization computing system initiates a campaign. The campaign includes one or more offers. Each offer corresponds to a personalized game to be played by end user. Completion of one or more hurdles in the personalized game leads to each respective end user device receiving a reward. The organization computing system receives from a client computing system one or more streams of end user transaction data. The one or more streams of end user transaction data include one or more transactions at a facility or organization associated with the client computing system. The organization computing system analyzes each of the one or more transactions to identify which transactions triggered completion of a hurdle for each end user device. The organization computing system monitors each end user's progress in the personalized game. Based on the monitoring, the organization computing system may generates one or more new versions of machine learning models, the one or more new versions of machine learning models configured to assign one or more offers to one or more end users and personalize each of the one or more offers for each end user.

In some embodiments, a non-transitory computer readable medium is disclosed herein. The non-transitory computer readable medium has instructions stored thereon, which, when executed by a processor, cause the processor to perform a method of customizing end user gaming experience. The method includes receiving a campaign creation request from a client computing system. The campaign creation request includes one or more parameters of a campaign associated with the campaign request. The method further includes creating the campaign based on the one or more parameters associated with the campaign request. The method further includes mapping one or more offers to an end user computing device of one or more end user computing devices. Each of the one or more offers includes a game having one or more hurdles. Completion of each of the one or more hurdles leads to a reward. The method further includes personalizing each of the one or more offers based on the end user to which each of the one or more offers was mapped. The method further includes pushing the one or more personalized offers to each respective end user device. The method further includes monitoring each end user's progression in a respective game. The method further includes updating each user's progression.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 8A is a block diagram illustrating a graphical user interface, according to example embodiments.

FIG. 8B is a block diagram illustrating a graphical user interface, according to example embodiments.

FIG. 10 is a block diagram illustrating a graphical user interface, according to example embodiments.

FIG. 13 is a block diagram illustrating a graphical user interface, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The one or more techniques described herein generally relate to a method and a system for customizing end user gaming experience. In particular, the method and system provided herein provide a real-time (or near real-time) marketing solution that optimizes multi-step offers for delivery to customers. For example, the intelligent framework of the system disclosed herein allows clients to unify client customers' motivations with business objectives. The system is able to scale to a given client's needs with a series of interlocking computational engines that continuously harvest, analyze, and act on real-time data. Accordingly, the one or more techniques described herein continuously observes and adapts to customer gaming experience, individuating campaigns and offers to engage customers and increase business objectives such as revenue, engagement, and business operations. This may be implemented using a customer feedback loop, which continuously learns about the client's customers from previous offers extended to the client's customers and the actions that client customers took in response to the previous offers.

Figure 1:
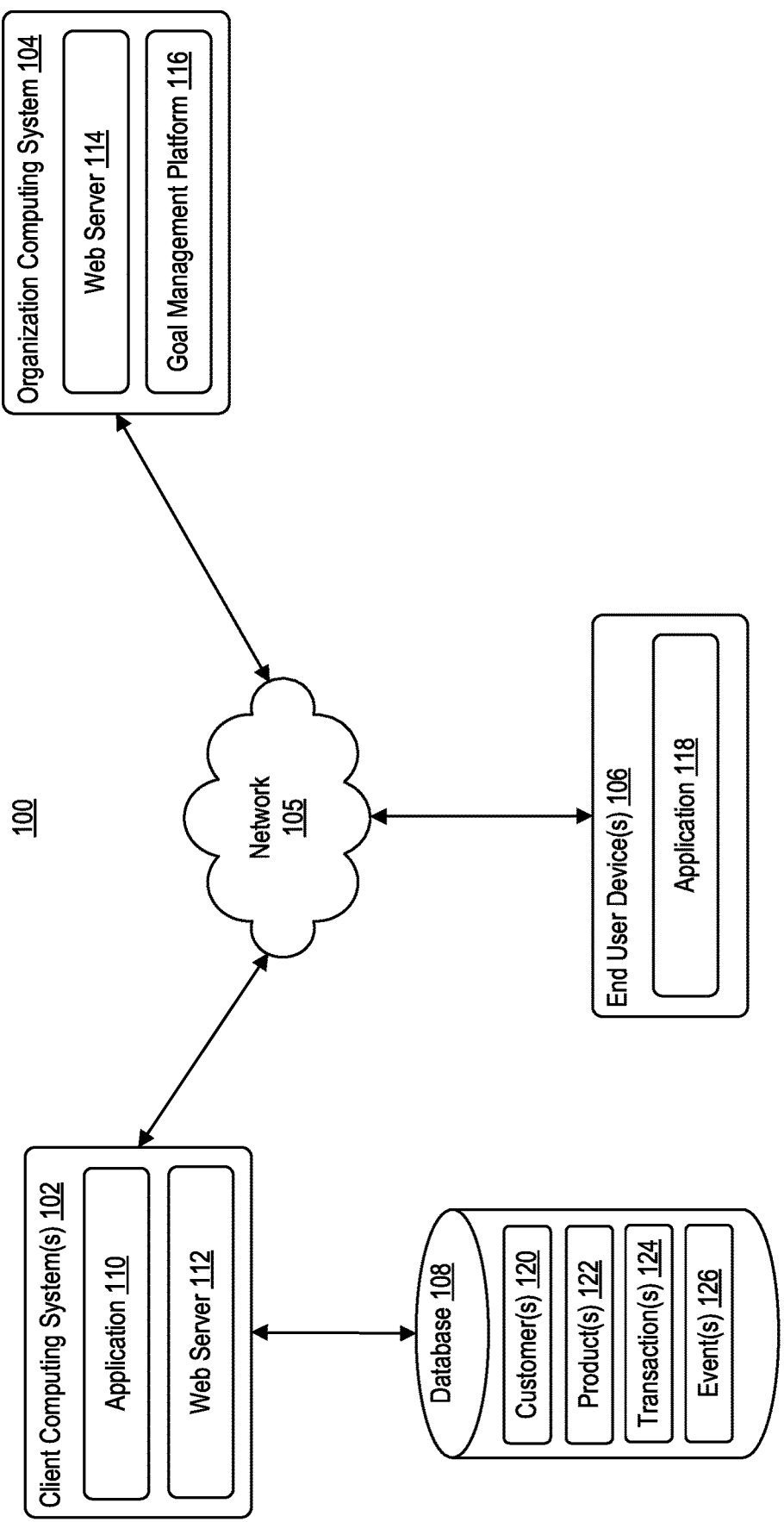
FIG. 1 is a block diagram illustrating a computing environment, according to example embodiments.

FIG. 1 is a block diagram illustrating a computing environment 100, according to one embodiment. Computing environment 100 may include at least a client computing system 102, organization computing system 104, and one or more end user computing devices 106. Client computing system 102, organization computing system 104, and one or more end user computing devices 106 may communicate via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receiving information between the components of system 100.

Client computing system 102 may be operated by a user (or client). For example, client computing system 102 may include one or more computing devices. Such computing devices may include a mobile device, a tablet, a desktop computer, or any computing system having the capabilities described herein. Client computing system 102 may belong to or be provided to an employee of an organization associated with client computing system 102.

Client computing system 102 may include at least application 110 and web server 112. Application 110 may be representative of a web browser that allows access to a service (or website) or a stand-alone application. Client computing system 102 may access application 110 to access functionality of organization computing system 104. Client computing system 102 may communicate over network 105 to generate a customized campaign to be provided to end user. For example, client computing system 102 may be configured to execute application 110 to define one or more parameters associated with the customized campaign. The content that is displayed to client computing system 102 may be transmitted to client computing system 102, and subsequently processed by application 110 for display through a display associated with client computing system 102.

Organization computing system 104 may be representative of one or more computing devices. Such computing devices may include, but are not limited to, a mobile device, a tablet, a desktop computer, or any computing system having the capabilities described herein. Organization computing system 104 may include at least web server 114 and motivation marketing platform 116.

Web server 114 may be representative of one or more computing devices configured to provide one or more web pages to client computing system 102. For example, web server 112 may be configured to provide one or more web pages to client computing system 102, such that client computing system 102 can access one or more functionalities of organization computing system 104. Web server 114 may communicate with client computing system 102 via application 110 executing on client computing system 102. For example, web server 114 may transmit one or more web pages to application 110 such that application 110 can render the one or more web pages and display the one or more web pages to a client via a display associated with client computing system 102.

Motivation marketing platform 116 may include one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Motivation marketing platform 116 may be configured to provide a real-time marketing solution that optimizes (or nearly optimizes) multi-step offers for delivery to end users. In particular, motivation marketing platform 116 is an intelligent framework that allows clients to unify customer motivations with business objectives. For example, motivation marketing platform 116 may generate a campaign, defined by one or more objectives conveyed by client computing system 102, which is pushed or transmitted to an intended audience (e.g., end users). Motivation marketing platform 116 may include one or more components (discussed in more detail in FIG. 2 below) that work in conjunction to continuously harvest, analyze, and act on real-time end user data. Over time, the continual harvesting, analyzing, and acting on real-time end user data may aid in improving (or optimizing) the campaign. Accordingly, motivation marketing platform 116 continuously observes and adapts to end user experience by individuating sales campaigns and offers to engage end users (e.g., customers of an organization or facility associated with client computing system 102) and increase revenue.

Referring back to client computing device 102, client computing device 102 may further include web server 112. Web server 112 may be representative of one or more computing devices configured to provide one or more web pages to one or more end user computing devices 106. For example, web server 112 may be configured to provide one or more web pages to an end user computing device 106, such that end user computing device 106 can access one or more functionalities of client computing system 102. Web server 112 may communicate with end user computing devices 106 via application 118 executing on each end user computing device 106. For example, web server 112 may transmit one or more web pages to application 118 such that application 118 can render the one or more web pages and display the one or more web pages to a client via a display associated with each end user computing device 106.

Client computing system 102 may be in communication with database 108. Database 108 may be configured to store one or more sets of information associated with client computing system 102. As illustrated, database 108 may include one or more customers 120, one or more products 122, one or more transactions 124, and one or more events 126. One or more customers 120 may be representative of one or more customers 120 that have transacted with a facility or organization associated with client computing system 102. For example, one or more customers 120 may be representative of one or more customers that have an account or profile with the facility or organization associated with client computing system 102. Such exemplary accounts or profiles may include a loyalty account with the facility or organization. A loyalty account may be a registered account with client computing system 102 which tracks end user purchases or transactions with the facility or organization associated with client computing system 102.

One or more products 122 may be representative of one or more products and/or services offered by the facility or organization associated with client computing system 102. In some embodiments, one or more products 122 may include a high-level, general description of the one or more products and/or services. For example, such high-level, general descriptions may include, but are not limited to, "blue shirt," "X brand of jeans," "deep tissue massage," "haircut and wash," and the like. In some embodiments, one or more products 122 may include a more granular description of the one or more products and/or services. For example, such granular descriptions may include a universal product code (UPC) or stock keeping unit (SKU) associated with each product offered by the facility or organization. In another example, such granular descriptions may include a particular code associated with each service offered by the facility or organization.

One or more transactions 124 may be representative of one or more transactions between one or more end users and the facility or organization associated with client computing system 102. In some embodiments, one or more transactions 124 may include one or more parameters associated with each transaction 124. Such parameters may include an identifier corresponding to a customer (e.g., end user) that made the transaction, product information associated with a product and/or service exchanged in the transaction, a date and/or time associated with the transaction, an account number associated with the customer (e.g., loyalty account number), and the like.

One or more events 126 may correspond to one or more events recommended by the client that may constitute completion of a hurdle. For example, one or more events 126 may designate which specific products may constitute completion of a hurdle, which types of products may constitute completion of a hurdle, and the like.

In order for organization computing system 104 to provide the real-time marketing solution (e.g., campaign) to end users, client computing system 102 may allow organization computing system 104 to access information stored in database 108. In some embodiments, client computing system 102 may continually or periodically transmit information stored in database 108 to organization computing system 104. In some embodiments, client computing system 102 may grant organization computing system 104 direct access to database 108, such that organization computing system 104 may access database 108 without intervention from client computing system 102.

Each end user computing device 106 may be representative of a mobile device, a tablet, a desktop computer, or any computing system having the capabilities described herein. Each end user computing device 106 may be operated by a customer 120 of a facility or organization associated with client computing system 104. For example, end user computing device 106 may be operated by an end user that has an account or profile with client computing system 102. In other words, each end user operating a respective end user computing device 106 may be representative of a customer 120 stored in database 108.

End user computing device 106 may include application 118 executing thereon. Application 118 may be representative of a web browser that allows access to a service (or website) or a stand-alone application. End user computing device 106 may access application 118 to access functionality of client computing system 102. For example, end user computing device 106 may access application 118 to manage an account or profile registered with client computing system 106. In some embodiments, end user computing device 106 may access application 118 to view and/or participate in an offer associated with a campaign generated by organization computing system 104. For example, client computing system 102 may push or provide to end user computing device 106 a customized offer to engage end user participation. The content that is displayed to end user computing device 106 may be transmitted to end user computing device 106, and subsequently processed by application 118 for display through a display associated with end user computing device 106.

Figure 2:
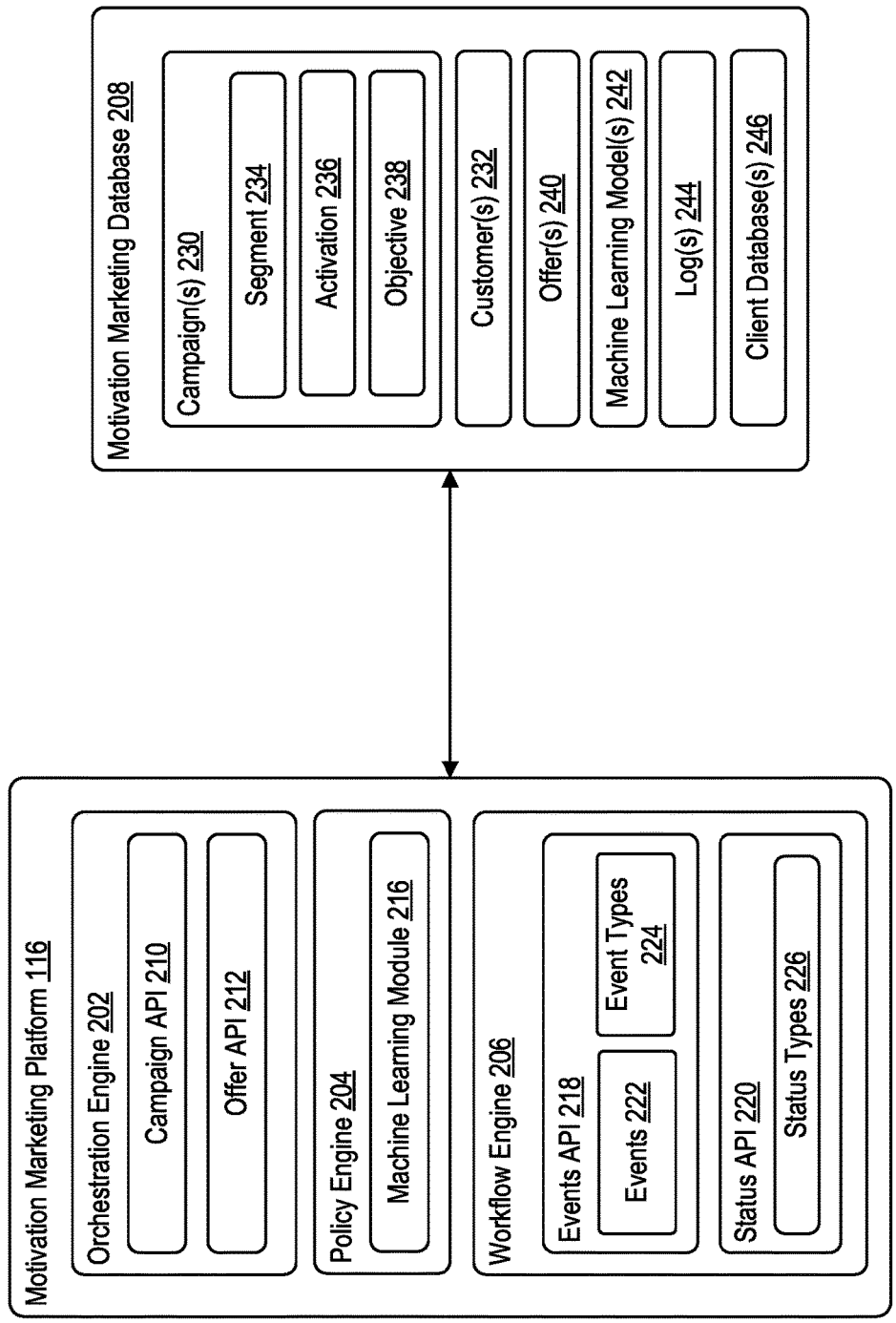
FIG. 2 is a block diagram of a component of the computing environment of FIG. 1, according to example embodiments.

FIG. 2 is a block diagram of a computing environment 200, according to exemplary embodiments. As illustrated, computing environment 200 includes motivation marketing platform 116 described in more detail.

Motivation marketing platform 116 may include at least an orchestration engine 202, a policy engine 204, a workflow engine 206, and client database 208. Each of orchestration engine 202, policy engine 204, and workflow engine 206 may be comprised of one or more software modules. The one or more software modules may be collections of code or instructions stored on a media (e.g., memory of motivation marketing platform 116) that represent a series of machine instructions (e.g., program code) that implements one or more algorithmic steps. Such machine instructions may be the actual computer code the processor of motivation marketing platform 116 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Orchestration engine 202 may be configured to create and configure one or more campaigns and one or more offers included in each of the one or more campaigns. A campaign may be loosely defined as a collection of offers. Each offer may be referred to as an experience that has been customized or personalized for a given end user. In other words, an offer may define a specific version of an experience, with actions or products, rules, and rewards, with which an end user may engage. A campaign may be distinguished or defined by its objective, its intended audience, and the period of time over which it is improved (or optimized) and delivered to end users. Orchestration engine 202 may be configured to receive input from client computing system 102 to define a campaign's objective, intended audience, and the period of time over which it is improved (or optimized) and delivered to users (i.e., its "activation"). In some embodiments, orchestration engine 202 may receive input from client computing system 102 via one or more application programming interface (API) requests. In some embodiments, orchestration engine 202 may receive input from client computing system 102 via a computing device associated with organization computing system 104 submitting one or more API requests. In some embodiments, orchestration engine 202 may receive input via a user interface through which a client may interact. For example, a client may define the campaign's objective, intended audience, and duration via a GUI displayed on client device 102.

An objective may be referred to as a fundamental component that represents a business goal of the client. Each of the one or more offers included in the campaign may be optimized to achieve the selected objective. Exemplary campaign objectives may include, but are not limited to, return on investment (ROI), net interest revenue (NIR), completions, and the like. ROI objective may correspond to a client desiring to increase profit margins. NIR objective may correspond to a client desiring to increase top line revenue. Completions objective may correspond to a client desiring to invest in building stronger customer relations. Each campaign objective may be optimized by a machine learning model.

The intended audience (or "segment") may correspond to a targeted group of customers the client wants to target. For example, the client may define the intended audience into a first group "New Customers" and a second group "Existing Customers" and generate different offers to be directed to each respective group. In another example, the client may define the intended audience by a set of predicates (e.g., new customers=customers created in the last 30 days) rather than a deterministic set of customer identifiers (e.g., new customers==ID1, ID2, ID3, ID4, etc.).

Orchestration engine 202 may include at least a campaign application programming interface (API) 210, and an offer API 212. Campaign API 210 may be configured to create and configure one or more campaigns. For example, via campaign API 210, client computing system 102 may be able to create one or more campaigns, add offers to one or more campaigns, create an offer configuration for one or more campaigns, and the like. Further, via campaign API 210, client computing system 102 may be able to update one or more settings for a particular campaign, update a specified offer for a campaign, and/or update specified campaign configurations. In some embodiments, campaign API 210 may further allow client computing system 102 to retrieve information about each campaign from database 208. For example, via campaign API 210, client computing system may retrieve the campaign objective, retrieve information about the specified offer in a campaign, retrieve information about order configuration, obtain a list of campaigns that were created, retrieve a list of campaigns that include a particular offer, retrieve a list of offers that were created for the particular client, retrieve a list of offers for a particular campaign, and the like.

Offers API 212 may be configured to create one or more offers and include one or more offers in a given campaign. Offers API 212 may define an offer assignment service, which is responsible for storing and maintaining offer state before the assignment of the offer, as well as effecting the assignment of the offer. Offers API 212 may be configured to individuate offer and assign each offer to an appropriate end user. Generally, an offer may represent a relationship between the campaign containing the offer and the end user.

Offers API 212 may present to client computing system 102 a listing of offers that are currently available. For example, offers API 212 may generate a GUI that includes the listing of offers, which may be accessed by client computing system 102 via a display associated with client computing system 102. Via the GUI, client computing system 102 may select one or more offers to be included in a particular campaign. Further, via the GUI, client computing system 102 may manage existing offers. For example, client computing system 102 may pause an offer, resume an offer, edit a name associated with an offer, expire an offer, edit an expiration date of an offer, or delete an offer.

Generally, each offer may have one or more parameters associated therewith. Such exemplary parameters may include, but are not limited to, a name of the offer, a deliver channel associated with the offer (e.g., electronic mail, mobile application, SMS message, etc.), a durations of the offer (e.g., how much time an end user has to complete the offer), and an expiration date of the offer (e.g., the last date and time at which any end user can complete the offer and win an reward).

Further, each offer may include a game to be played by the end user. Each game includes one or more hurdles. Each hurdle may refer to an objective in the completion of the game. For example, a hurdle may be made up of multiple transactions. A game may require the completion of one or more hurdles. An exemplary hurdle may be, for example, the purchase of a particular item at the facility or organization associated with client computing system 102. Upon completion of each hurdle, an end user may receive a reward.

For a product/service purchase or action type hurdle, campaign API 210 may define the product/service purchase by, for example, (a) a personalized product, if the offer type is integrated with a separate product recommendation model; (b) a descriptive product attribute such as "new arrival," "lattes," "premium flights," "blue shirts," "sixty minute massage," etc.; or (c) a specific product, UPC, or SKU.

For a spend or quantity threshold type hurdle, campaign API 210 may define a spend threshold and/or a quantity threshold. For example, to achieve a hurdle, the client may require an end user to purchase a product at least three times (i.e., quantity) spending at least $500 total (i.e., spend). In some embodiments, the spend threshold can be a personalized spread threshold, if, for example, the offer type is integrated with a separate spend recommendation model. In some embodiments, the spend threshold may be an explicit spend threshold.

Campaign API 210 may further be configured to define a reward to be provided to an end user, should the end user achieve each hurdle in the game (although a reward is not required). In some embodiments, campaign API 210 may define a fixed reward. A fixed reward may have one or more variants. For example, assume offer API 212 defines a first hurdle having a fixed reward with an explicit reward for 1,000 points. Campaign API 210 may configure another reward variant with an explicit reward of 500 points. Accordingly, campaign API 210 created two offers: one with a reward of 1000 points; another with a reward of 500 points. In some embodiments, campaign API 210 may define a random reward. A random reward may consist of a group of explicit rewards and corresponding distributions. After completing a hurdle, an end user may randomly receive a reward based on its respective distribution. For example, assume a hurdle has one reward of 1000 points with a 20% distribution and another reward has 500 points with an 80% distribution. The end user will have a 20% chance of winning 1000 points and an 80% chance of winning 500 points after completing the hurdle.

Offer API 212 may be configured to assign one or more offers to a particular end user. Offer API 212 may be an offer assignment request, given a particular customer, and the campaign associated with the customer. The response to the Offer API request may be a fully personalized offer instance that has been assigned to the customer. Offer API 212 may receive, as input, one or more sets of data related to one or more end users associated with client computing system 102. For example, organization computing system 104 may access one or more sets of customer information stored in database 106. Offer API 212 may provide as input to a machine learning algorithm housed in machine learning module 216 the one or more sets of customer information. Such suitable machine learning algorithms may include, but are not limited to, supervised learning, unsupervised learning, reinforcement learning, neural networks, contextual multi-armed bandits, linear regressions, random forest, and the like. As output, machine learning module 216 may generate a model that selects one or more offers for each end user. Accordingly, offer API 212 in conjunction machine learning module 216 may assign one or more offers to each end user.

For example, machine learning module 216 may be configured to assign a game corresponding to a particular offer to each particular end user. Machine learning module 216 may assign the game based on one or more sets of customer information stored in database 108 as well as the type of offer assigned to the particular end user. Although the term "game" is used, the game referred to herein may be referred to as an "offer."

Exemplary game structures may include, but are not limited to, multi-option multiplier games, pattern lock games, scratcher games, choose your own adventure games, a visit game, a bonus game, a loop game, a nudge game, and the like.

A multi-option multiplier game may include one or more offers that may be intended to introduce customers to new experiences, new products, and/or new services. For example, a multi-option multiplier game may prompt a user to buy an easy product, an easy product, and a hard product before earning a $50 reward. In another example, a multi-option multiplier game may prompt a user to download a mobile application and check a bag at the airport counter to earn ten thousand reward miles.

A pattern lock game may include one or more offers that may be configured to reinforce user behavior and/or deepen user engagement. For example, a pattern lock game may prompt a user to visit a store five times in seven days to earn one-hundred reward stars. In another example, a dash game may prompt a user to buy and fly three times in the next thirty days for thirty thousand miles.

A scratcher game may include one or more offers that are intended to appeal to users that like surprises and/or novelty. For example, a scratcher game may prompt a user to buy three lattes for: (1) a ten percent chance of earning one-hundred reward stars; (2) a forty percent chance of earning fifty reward stars; or (3) a fifty percent chance of earning twenty reward stars.

A choose-your-own adventure game may include one or more offers that are constructed to engage customers that may be motivated by control. For example, a choose-your-own adventure game may include one of the following: (1) visit a store five times in seven days to earn one-hundred stars; (2) buy five lattes for one-hundred stars; or (3) buy one latte, two muffins, and one sandwich for one-hundred stars.

A visit game may be similar to a pattern lock game. In other words, a visit game may be a pattern lock game that is visit based. For example, a visit game may prompt a user to visit a store and purchase anything, rather than having to purchase a specific item, type of item, or monetary amount.

A loop game may be any of the above-referenced games, but may be repeated multiple times.

A bonus game may be any of the above-referenced games, but also offers an additional reward for completing all offer hurdles, in addition to rewarding a user for completing individual hurdles.

In some embodiments, each game may be stored in a graph-like data structure. For example, a developer may generate a graph-like structure using Dhall configuration language and then run the information through a tool that transforms human-readable Dhall into protocol buffer. In another example, a developer may generate a graph-like structure via a user interface which may translate intermediary configurations stored in the user interface into similar protocol buffers.

Policy engine 204 may work with orchestration engine 202. For example, while orchestration engine mediates relationships between, campaigns, offers, and end users, policy engine 204 may personalize each assigned offer to each end user and perform real-time analysis on campaign results. Policy engine 204 may include at least machine learning module 216. Machine learning module 216 may be configured with one or more tasks. In some embodiments, machine learning module 216 may be configured to one or more hurdles and rewards within a particular offer. For example, machine learning module 216 may be configured to personalize the assigned offer to each particular end user.

For example, machine learning module 216 may be configured to tailor the offer assigned to a particular end user (by machine learning module 216) based on one or more attributes of the user. Machine learning module 216 may further be configured to predict which set of personalized offers to determine which set would produce the best results given a particular business objective. Machine learning module 216 select such hurdles, rewards, and personalized offers using one or more prediction models generated by its infrastructure.

In some embodiments, machine learning module 216 may provide, as input, to a machine learning algorithm the one or more sets of customer information. Such customer information may include both descriptive attributes of the customer and a transaction history associated with the customer at the facility or organization associated with client computing system 102. Such suitable machine learning algorithms may include, but are not limited to, supervised learning, unsupervised learning, reinforcement learning, neural networks, contextual multi-armed bandits, linear regressions, random forests, and the like. As output, machine learning module 216 may generate a personalized offer to be pushed to each end user. For example, for a particular end user, machine learning module 216 may generate a unique version of an offer by adjusting a number of hurdles until the particular end user receives a reward.

In some embodiments, policy engine 204 may further be configured to personalize the game assigned to each end user. For example, through user specific information, policy engine 204 may determine that a particular user is less engaged with the product or service than another user. Accordingly, for this particular user, policy engine 204 may create less burdensome hurdles that the particular user may more easily achieve. By doing so, policy engine 204 personalizes the game in such a way as to elicit an engagement from the particular user.

Workflow engine 206 may be configured to manage an interaction between end users and the offers that are assigned thereto. For example, workflow engine 206 may receive, from policy engine 204, one or more offers that are personalized to each respective customer. Workflow engine 206 may, in turn, push each of the one or more personalized offers to each respective customer. In some embodiments, workflow engine 206 may directly interface with application 118 executing thereon. For example, workflow engine 206 may be granted access to application 118 that is hosted by web server 112 on client computing system 102. In some embodiments, workflow engine 206 may transmit each of the one or more personalized offers to client computing system 102. Client computing system 102 may, in turn, push each of the one or more personalized offers to each respective end user device 106.

Workflow engine 206 may include at least events API 218, status API 220, and any personalization changes applied by machine learning module 216. Events API 218 may be configured to manage one or more incoming events to motivation marketing platform 116. In other words, as end users opt into and/or choose to participate in an offer represented by a game, events associated with the game may be transmitted to motivation marketing platform 116 and processed by events API 218. For example, as end users that have opted into the game transact at the facility or organization associated with client computing system 102, such events are handled by events API 218. In some embodiments, events API 218 may process all events, whether or not the customer has an active offer. If, for example, there is an active offer, receiving an event for the customer triggers evaluation of the offer to see if the new event caused progress. If there isn't an active offer, the event may be held for a period to see if any active offer later arrives for that customer. As such, the system may be able to maintain a full transaction history for roughly the length of the longest offer that exists.

In some embodiments, workflow engine 206 may further include transaction history associated with each customer. Transaction history may include one or more transactions made by each customer 232 at the facility or organization.

Tracking and handling of events by events API 218 aids in improving machine learning algorithm of machine learning module 216, as well as guiding the overall campaign selected by client computing system 102. Events API 218 may be configured to define the methods that queue one or more incoming events for processing by workflow engine 206. Events API 218 may include one or more events 222. One or more events 222 may be representative of one or more activities received by events API 218 from one or more end user devices 106 and/or client computing system 102. In some embodiments, events API 218 may transmit one or more incoming events 222 to workflow engine 206 periodically. For example, events API 218 may transmit one or more incoming events 222 to workflow engine 206 in one or more batches. In other words, in some embodiments, workflow engine 206 may process one or more events 222 in batch processing. In some embodiments, events API 218 may transmit one or more incoming events 222 to workflow engine 206 in real-time (or in near real-time). For example, events API 218 may transmit one or more incoming events 222 to workflow engine 206 as each of the one or more events 222 are transmitted to motivation marketing platform 116. In other words, in some embodiments, workflow engine 206 may process one or more events 222 in stream processing.

Status API 220 may be configured to communicate with one or more downstream systems. Status API 220 provides access to an offer (or game) status of each end user. An email marketing system (not shown) may leverage Status API 220 (or it's streaming counterpart, the Actions Stream) to determine who to email regarding offer state progression. Status API 220 may be configured to update an end user's status upon processing of an incoming event. For example, event API 218 may transmit a batch of events to workflow engine 206. One such event in the batch of events may correspond to an end user accepting an offer and starting a game associated therewith. Accordingly, workflow engine 206 may communicate processing of the event to status API 220, which may, in turn, publish the incremental status progress associated with the respective end user to a data stream.

Referring back to policy engine 204, policy engine 204 may continually monitor events and end user statuses to improve (e.g., optimize) end user experience. In some embodiments, policy engine 204 may leverage an automated, non-trivial, process of training machine learning models, versioning the machine learning models, and verifying that the new machine learning models perform better than older machine learning models. If, policy engine 204 determines that a new machine learning model is not better than a previous machine learning model, policy engine 204 may revert to the previous machine learning model. In some embodiments, policy engine 204 may use reinforcement learning via machine learning module 216, using contextual bandits, to continually improve end user experience. For example, via reinforcement learning techniques, policy engine may continually learn tasks, acquire skills, and provide real-time decisions. In some embodiments, such training may be performed daily. Policy engine 204 may improve user experience over the phases of a campaign life cycle, including, but not limited to, offer creation, campaign creation, addition of offers to the campaign, analysis of campaign results, identification and pausing of offers that do not perform well, identification of high-performing offers, a recommendation to create new offer variants based on machine learning processes, and the like. Policy engine 204 may act on its leanings by creating new offer variants and returning them to orchestration engine 202 for inclusion in the active campaign.

On a conceptual level, the interactions between policy engine 204 and end users, via monitored events and statuses, may be interpreted as a sequence of interactions with individual end users that follow the template of: observing a context, taking an action, and observing a result. Many such interactions may occur possibly overlapping in time. Policy engine's 204 objective, for example, is to improve (e.g., optimize) the action for a given context so as to bring about the most desirable result.

The context (which may be represented as a feature vector) may encompass one or more properties of the current customer and/or potential actions to be taken. The context may be known by policy engine 204 at action time. The results may contain a log of events, which may be observable by policy engine 204 not long after an action is chosen. The result log may be analyzed to determine the numerical reward returned to policy engine 204. For example, policy engine 204 may implement a MapReduce process that uses logs to generate a numerical machine learning reward.

Policy engine's 204 overall decision-making process may be governed by a machine learning algorithm (e.g., model) trained by machine learning module 216. As end users participate in the game corresponding to an offer, such information may be input from workflow engine 206 to policy engine 204. Machine learning module 216 may continuously improve user experience by responding to changes in a campaign's available offers (e.g., if a user or operator adds or removes offers from the campaign) and changes in the customer's that are part of the campaign (e.g., if the location of a customer switches from the east-coast to the west-coast). Machine learning module 216 may adjust (e.g., optimize) to those new circumstances, without requiring user intervention. Machine learning module 216 may leverage the machine learning algorithm to continually improve user experience by generating one or more offer variants to be added to the campaign. The one or more offer variants may be communicated from policy engine 204 to orchestration engine 202. Accordingly, orchestration engine 202 may prompt a client to add the new offer variants to campaign to improve (e.g., optimize) end user experience.

Motivation marketing platform 116 may communicate with motivation marketing database 208. Motivation marketing database 208 may include one or more campaigns 230, on or more customers 232, one or more offers 240, one or more machine learning models 242, one or more logs 244, and one or more partial copies of client databases 246.

One or more campaigns 230 may be representative of one or more campaigns 230 generated by motivation marketing platform 116. In some embodiments, one or more campaigns 230 may be representative of one or more active campaigns. In some embodiments, one or more campaigns 230 may be representative of one or more active campaigns and one or more expired campaigns.

Each campaign 230 may represent a business relationship between client computing system and a group of end users (e.g., customers of the client). Each campaign 230 may include at least a segment 234, an activation 236, and an objective 238. Segment 234 may represent a selected subset of end users. Example segments 234 may include, for example, "new customers" and "existing customers." One or more offers may be assigned to each segment 234. Activation 236 may be representative of a start date and an end date. In some embodiments, activation 236 may be an action that opts a person into a campaign. For example, a "mobile application download" trigger may opt a person into the "first time application use" campaign that may dispense various offers for interacting with particular application features. Objective 238 may be representative of a business goal associated with the campaign. All offers may be optimized or tailored to achieve objective 238. Exemplary objectives 238 may include, but are not limited to: revenue, return on investment (ROI), or customer engagement.

Customers 232 may be representative of one or more customers (e.g., end users) of an organization or facility associated with client computing system 102. In some embodiments, customers 232 may include one or more attributes or features associated with each customer. Such one or more attributes or features may not, by themselves, be sufficient to de-anonymize the end user; however, such one or more attributes or features may be sufficient to identify a particular anonymous user.

Offers 240 may be representative of one or more fully personalized offers generated by machine learning module 216. For example, offers 240 may be representative of the one or more offers personalized for each customer denoted in customers 232.

Machine learning models 242 may be representative of one or more prediction models generated by machine learning module 216. For example, machine learning models 242 may include one or more prediction models for generating fully personalized offers, one or more prediction models for selecting a subset of fully personalized offers for each user, and the like. In some embodiments, one or more machine learning models 242 may continually be updated based on results of each campaign.

Logs 244 may be representative of end user progress through each game. For example, logs 244 may include the progress of the end user through a game corresponding to their fully personalized offer.

Client database 246 may be representative of a copy of database 108 associated with a particular client. For example, in some embodiments, client database 246 may be representative of a partial copy of database 108. Storing at least a portion of database 108 locally as client database 246 may reduce requests sent between organization computing system 104 and client computing systems 102.

Figure 3:
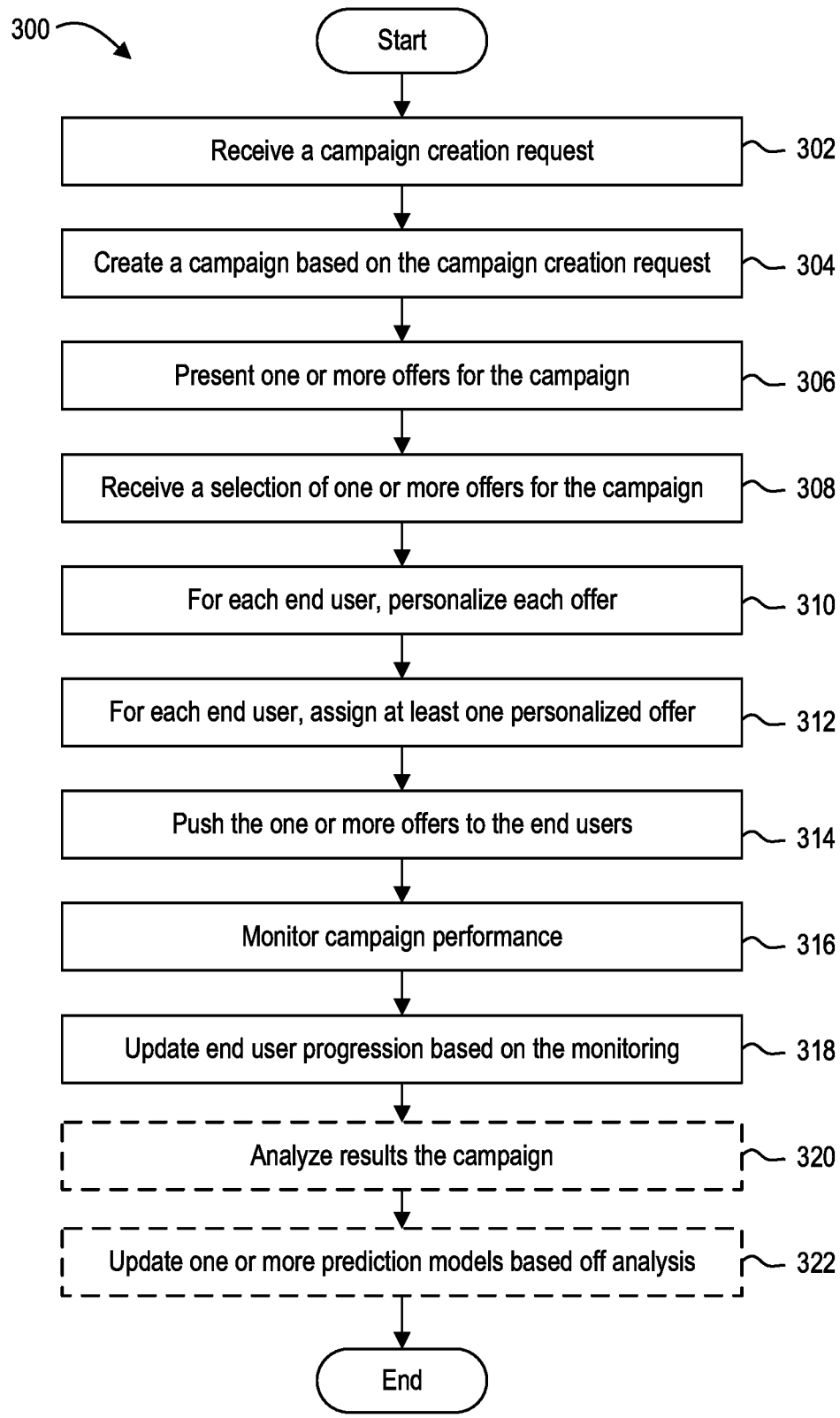
FIG. 3 is a flow diagram illustrating a method for implementing an engagement campaign, according to one exemplary embodiment.

FIG. 3 is a flow diagram illustrating a method 300 for implementing an engagement campaign, according to example embodiments. Method 300 may begin at step 302. At step 302, organization computing system 104 may receive a campaign creation request. In some embodiments, organization computing system 104 may receive the campaign creation request from client computing system 102. For example, organization computing system 104 may receive the campaign creation request via application 110 executing on client computing system 102.

In some embodiments, campaign request may include one or more parameters associated therewith. One or more parameters may include a specification of a business objective. Exemplary business objectives may include, but are not limited to, revenue, return on investment, customer engagement, and the like. One or more parameters may further include one or more sets of end user information. End user information may correspond to information about customers associated with client computing system 102. Such user information may include, for example, end user descriptive attributes and transaction history of each end user at an organization or facility associated with client computing system 102.

At step 304, organization computing system 104 may create a campaign based on the creation request. For example, organization computing system 104 may initialize a campaign based on the one or more parameters associated with the campaign creation request.

At step 306, organization computing system 104 may present one or more offers to client computing system 102. Organization computing system 104 may present one or more offers that correspond to an identified business objective. Organization computing system 104 may generate a graphical user interface (GUI) that includes a listing of one or more offers that correspond to the identified business objective. Such listing of one or more offers may allow a client to sort offers by one or more offer attributes. For example, the list of one or more offers may include one or more sortable columns. Such columns may include, for example: offer name, offer type, offer assignment begin date, offer expiration date, number of hurdles, duration of the offer, and status of the offer. Organization computing system 104 may transmit GUI to client computing system 102 for display. For example, organization computing system 104 may transmit GUI to client computing system 102 via application 110 executing thereon, such that application 110 can render GUI and display the GUI to the client via a display associated therewith.

At step 308, organization computing system 104 may receive a selection of one or more offers from client computing system 102. For example, client computing system 102 may receive as input, via the GUI, an indication that the client selects one or more offers. Client computing system 102 may relay the input to organization computing system 104 for processing.

At step 310, organization computing system 104 may map one or more offers to at least one end user. For example, orchestration engine 202 may be configured to assign one or more offers to a particular end user via machine learning module 216. Orchestration engine 202 may provide, as input, one or more sets of data related to one or more end users associated with client computing system 102. For example, organization computing system 104 may access one or more sets of customer information stored in database 108 and provide as input to a machine learning algorithm the one or more sets of customer information. Such suitable machine learning algorithms may include, but are not limited to, supervised learning, unsupervised learning, reinforcement learning, neural networks, contextual multi-armed bandits, linear regressions, random forests, and the like. As output, orchestration engine 202 may generate a mapping between one or more offers and an end user.

At step 312, for each end user, organization computing system 104 may personalize the mapped offer to each respective end user. For example, policy engine 204 may be configured to personalize the assigned offer to each particular end user, via machine learning module 216. Policy engine 204 may tailor the offer assigned to a particular end user (by machine learning module 216) based on one or more attributes of the user. Policy engine 204 may provide, as input, to a machine learning algorithm the one or more sets of customer information. Such customer information may include both descriptive attributes of the customer and a transaction history associated with the customer at the facility or organization associated with client computing system 102. Such suitable machine learning algorithms may include, but are not limited to, supervised learning, unsupervised learning, reinforcement learning, neural networks, contextual multi-armed bandits, linear regressions, random forests, and the like. As output, policy engine 210 may generate a personalized offer to be pushed to each end user.

At step 314, organization computing system 104 may push the one or more personalized offers to each respective end user. Policy engine 204 may transmit each of the one or more personalized offers to workflow engine 206. Workflow engine 206 may manage an interaction between end users and the offers that are assigned thereto. Workflow engine 206 may, in turn, push each of the one or more personalized offers to each respective customer. In some embodiments, workflow engine 206 may directly interface with application 118 executing thereon. For example, workflow engine 206 may be granted access to application 118 that is hosted by web server 112 on client computing system 102. In some embodiments, workflow engine 206 may transmit each of the one or more personalized offers to client computing system 102. Client computing system 102 may, in turn, push each of the one or more personalized offers to each respective end user device 106.

At step 316, organization computing system 104 may monitor campaign performance. Organization computing system 104 may monitor campaign performance by receiving transaction information from client computing system 102. In some embodiments, transaction information may flow from client computing system 102 to organization computing system 104 via workflow engine 206. For example, events API 218 may be configured to receive one or more transaction events from client computing system 102. Event API 218 may transmit one or more transaction events to workflow engine 206 for processing. In some embodiments, event API 218 may transmit one or more transaction events to workflow engine 206 periodically, in one or more batches. In some embodiments, event API 218 may transmit one or more transaction events to workflow engine 206 in real-time (or near real-time), by streaming the one or more transaction events to workflow engine 206.

At step 318, organization computing system 104 may update end user progression based on the monitoring. As workflow engine 206 processes each transaction event, workflow engine 206 may work in conjunction with status API 220 to update each end user's status in their respective offer. For example, workflow engine 206 may update each end user's game with any hurdles that may have been satisfied.

In some embodiments, method 300 may further include steps 320 and 322. At step 320, after a campaign has ended, machine learning module 216 may analyze the results of the campaign. For example, machine learning module 216 may parse through logs 244 to identify those offers that generated a higher level of participation and those offers that generated a lower level of participation.

At step 322, machine learning module 216 may update one or more prediction models based on the identified data in step 320. For example, machine learning module 216 may update a first prediction model dedicated to offer personalization and a second prediction dedicated to selecting between personalized offers. Personalization models may be trained on a per-campaign or per-client basis. Selection models are trained with reinforcement learning algorithms on a per-campaign basis. Updating the prediction models may be done by running a campaign and recording the raw events that occurred during the campaign. In some embodiments, the raw data may include: customers and attributes that are part of the campaign, offers assigned to each customer, how each offer is personalized, the raw events that are generated by customers, the progress customers makes in their offers, and how the offer contributed to the company's campaign objective. Organization computing system 104 may transform the received raw data into machine learning logs that a particular machine learning model can be trained on. Machine learning module 216 may then retrains one or more existing models on the expanded data set. Machine learning module 216 may compare the predictive performance of the old version of the model to the new one on historic events. If the new model performs better than the old model, machine learning module 216 may choose to use the new model for future predictions in production.

Figure 4:
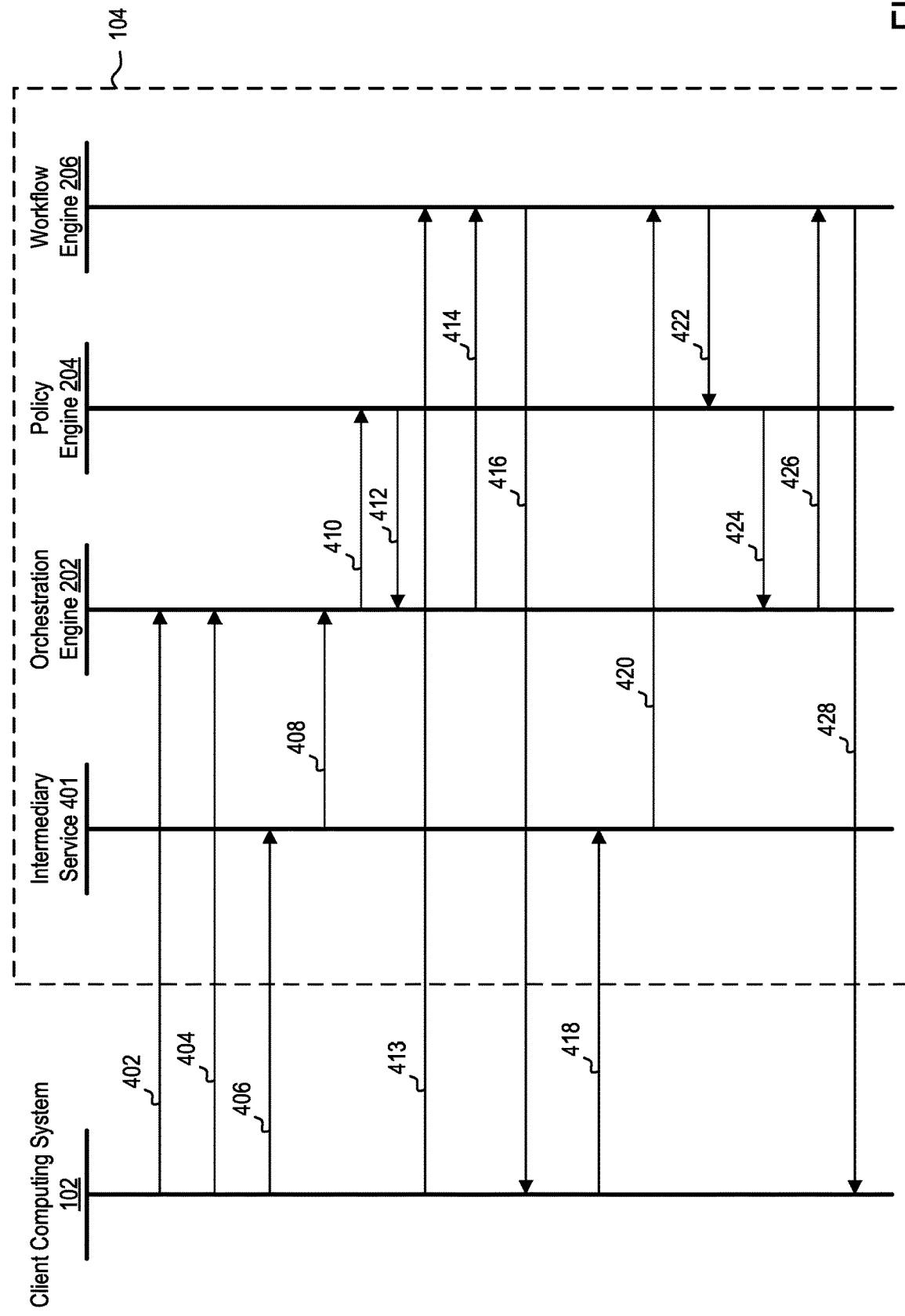
FIG. 4 is a logical block diagram illustrating a method for implementing an engagement campaign, according to example embodiments.

FIG. 4 is logical diagram 400 illustrating a method for implementing an engagement campaign, according to example embodiments. Logical diagram 400 may include client computing system 102 interacting with organization computing system 104. Organization computing system 104 may include intermediary service 401, orchestration engine 202, policy engine 204, and workflow engine 206. Intermediary service 401 may be configured to standardize and normalize incoming data, such that one or more components of organization computing system 104 may better process the information.

At operation 402, client computing system 102 may transmit a campaign request to orchestration engine 202. The campaign request may include one or more parameters associated with the campaign. One or more parameters may include a specification of a business objective. Exemplary business objectives may include, but are not limited to, revenue, return on investment, customer engagement, and the like. In some embodiments, the one or more parameters associated with the campaign may further include a duration of the campaign, one or more sets of target customers for the campaign, one or more descriptions associated with each of the one or more sets of target customers, and the like. In some embodiments, the campaign request may further comprise a specification of one or more offers to be added to the campaign.

At operation 404, client computing system 102 may request that organization computing system 104 start the requested campaign. For example, client computing system 102 may request that orchestration engine 202 begin assigning one or more offers to each targeted end user.

At operation 406, client computing system 102 may transmit one or more sets of data to organization computing system 104. For example, intermediary service 401 may receive one or more sets of data from client computing system 102. In some embodiments, operation 406 may occur simultaneously with operation 404. The one or more sets of data may include customer specific information (e.g., descriptive attributes, transaction history, one or more user profile preferences, etc.). Upon receiving the one or more sets of data from client computing system 102, intermediary service 402 may transform the data from a first format to a second format. For example, intermediary service 402 may standardize and normalize the data, such that the information is more easily processed by one or more components of organization computing system 104.

At operation 408, intermediary service 401 may transmit the transformed data to orchestration engine 202 for processing. At operation 410, policy engine 204 may personalize one or more offers to each respective end user. For example, policy engine 204 may leverage the end user (e.g., customer) specific information and machine learning module 116 to personalize each offer for each end user. Policy engine 204 may transmit each personalized offer to orchestration engine 202.

At operation 412, orchestration engine 202 may assign one or more fully personalized offers to each end user. For example, orchestration engine 202 may leverage machine learning module 114 to generate the mappings between one or more fully personalized offers and each end user. Orchestration engine 202 may transmit the offer assignments to policy engine 204 for personalization.

At operation 413, workflow engine 206 may receive one or more sets of data from client computing system 102. The one or more sets of data may include product information data (e.g., UPC, SKU, product categories, etc.). Upon receiving the one or more sets of data from client computing system 102, intermediary service 402 may transform the data from a first format to a second format. For example, intermediary service 402 may standardize and normalize the data, such that the information is more easily processed by workflow engine 206.

At operation 414, orchestration engine 202 may transmit the personalized offers to workflow engine 206 for execution. For example, orchestration engine 202 may instruct workflow engine 206 to execute one or more workflows corresponding to each personalized offer.

At operation 416, workflow engine 206 may transmit the personalized offers to client computing system 102. In some embodiments, workflow engine 206 may directly interface with each end user device 106. In some embodiments, workflow engine 206 may transmit each of the one or more personalized offers to client computing system 102. Client computing system 102 may, in turn, push each of the one or more personalized offers to each respective end user device 106.

At operation 418, client computing system 102 may transmit transaction data to organization computing system 104. In some embodiments, client computing system 102 may stream transaction data to organization computing system 104, i.e., client computing system 102 may transmit transaction data to organization computing system 104 in real-time (or near real-time). In some embodiments, client computing system 102 may periodically transmit transaction data to organization computing system 104.

At operation 420, intermediary service 402 may transform the transaction data from a first format to a second format. For example, intermediary service 402 may standardize and normalize the data, such that the information is more easily processed by one or more components of organization computing system 104. Intermediary service 402 may transmit the transaction data to workflow engine 206 for processing.

At operation 422, workflow engine 206 may process the received transaction data. For example, workflow engine 206 may update each end user's progression in their respective game, based on the transaction data received. Workflow engine 206 may transmit the results to policy engine 204.

At operation 426, orchestration engine 202 may instruct workflow engine 202 to push the one or more new offer recommendations to client computing system 102. At operation 428, workflow engine 206 may communicate offer progress to client computing system 102.

Figure 5:
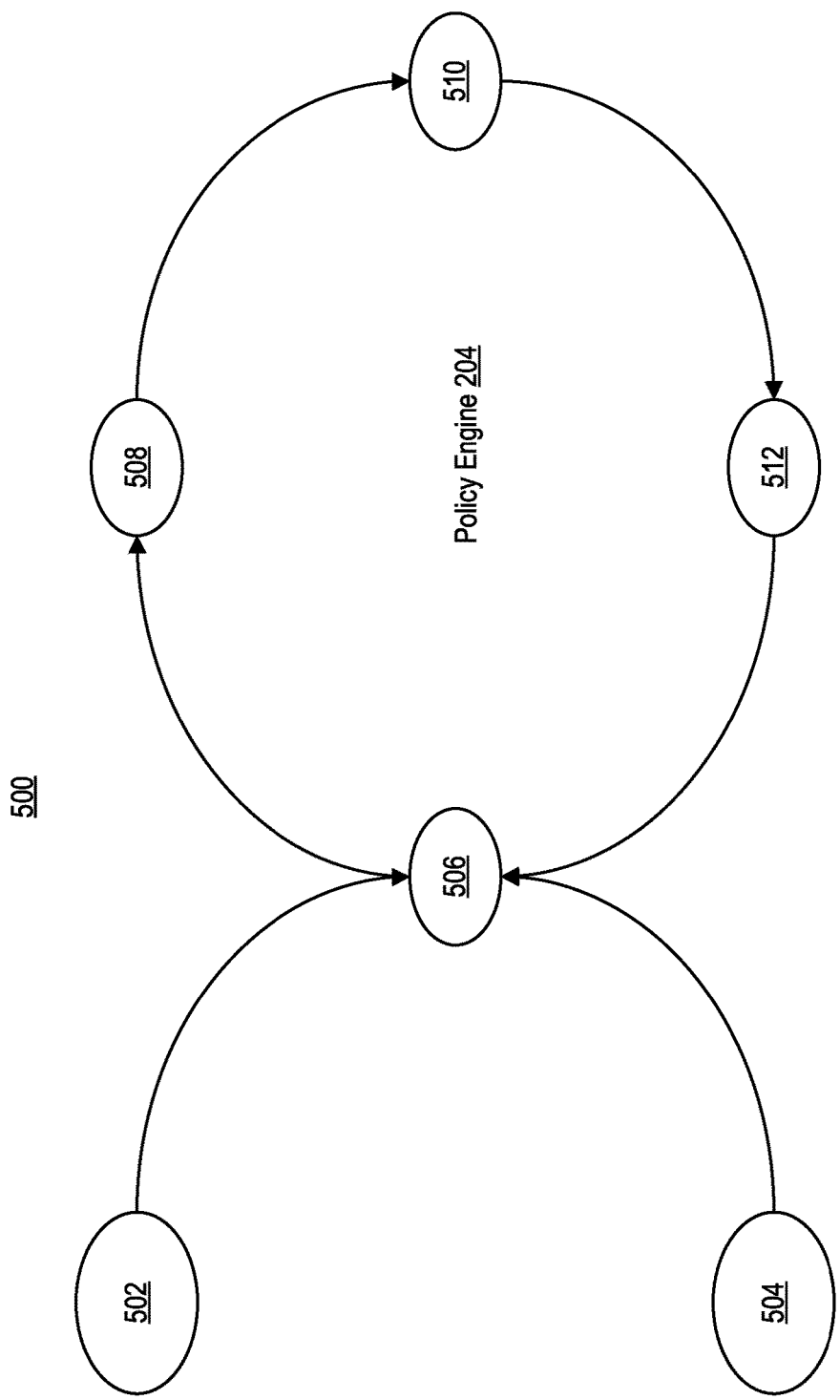
FIG. 5 is a flow diagram illustrating a method for implementing an engagement campaign, according to example embodiments.

FIG. 5 is a block diagram 500 illustrating a campaign life cycle, according to example embodiments. Campaign life cycle may begin at operation 502. At operation 502, organization computing system 104 may create one or more offers. At operation 504, organization computing system 104 may create a campaign. In some embodiments, orchestration engine 202 may create a campaign based on one or more parameters provided by the requesting client. At operation 506, organization computing system 104 may add one or more offers to the campaign. For example, orchestration engine 202 may add one or more offers to the campaign based on one or more selections by client computing system 104.

At operation 508, organization computing system 104 may analyze campaign results. In some embodiments, prediction engine 204 may monitor campaign results in real time (or near real time). In some embodiments, prediction engine 204 may monitor campaign results periodically. Monitoring campaign results may include prediction engine 204 monitoring the progress of each of the one or more offers in the campaign. For example, prediction engine 204 may monitor each offer to analyze how an end user assigned to the offer is reacting to the offer.

At operation 510, organization computing system 104 may identify high-performing offers. In some embodiments, as part of the analysis discussed above in conjunction with operation 508, policy engine 204 may assign a performance metric to each offer. The performance metric may reflect a level of engagement with one or more customers to a respective offer. For example, policy engine 204 may determine that an offer corresponding to a transaction frequency performs better (i.e., garners more customer engagement) than a transaction amount. Policy engine 204 may identify those offers that perform the highest. For example, policy engine 204 may identify one or more offers that exceeds a threshold engagement level.

At operation 512, organization computing system 104 may generate new offers based on the identified high-performing offers. In some embodiments, organization computing system 104 may generate new offers as one or more variants of the identified high-performing offer. The one or more new offers may be made available to the client for addition to the campaign.

The offer life cycle may repeat as new offers are added to the campaign by client computing system 102. For example, when offers are added to the campaign, policy engine 204 may continually analyze the results and make recommendations to client computing system 102.

Figure 6:
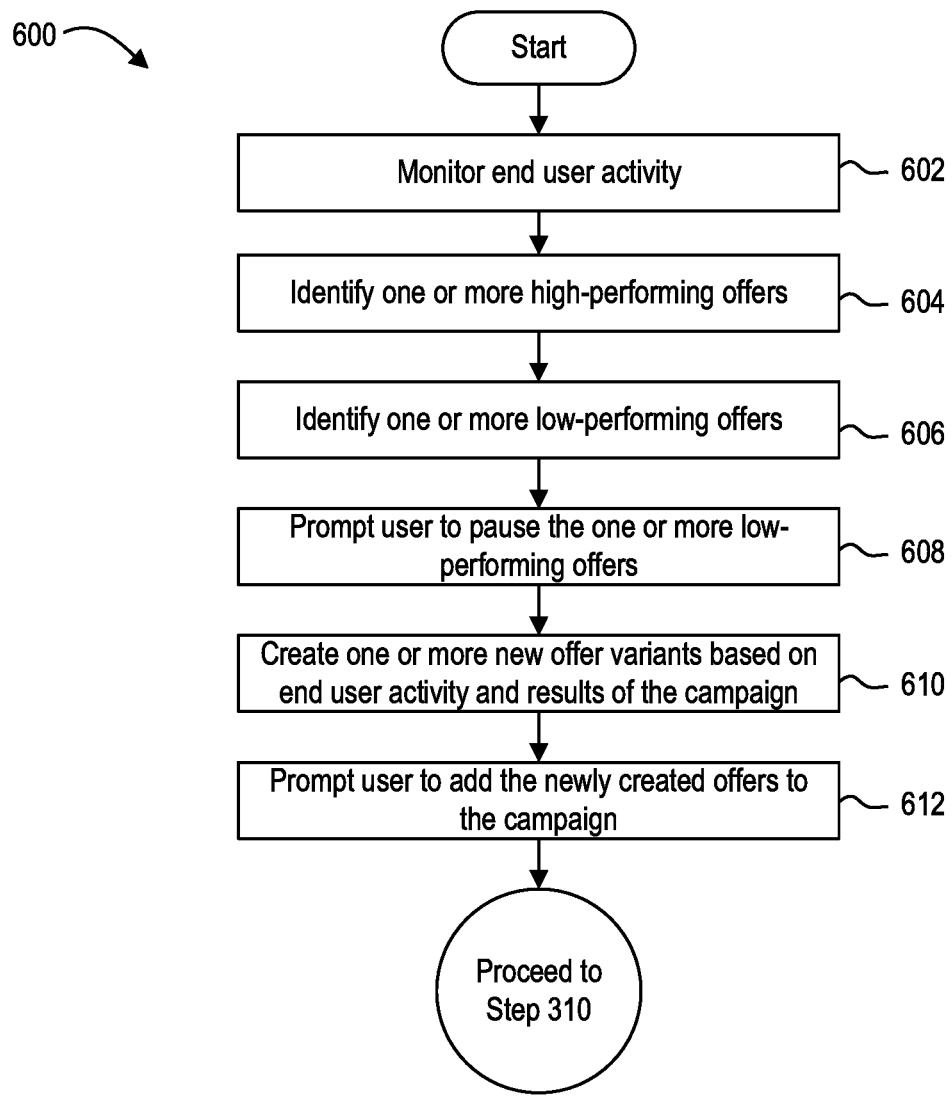
FIG. 6 is a flow diagram illustrating a method for implementing an engagement campaign, according to example embodiments.

FIG. 6 is a flow diagram illustrating a method 600 of implementing a campaign, according to one exemplary embodiment. Method 600 may begin at step 602. At step 602, organization computing system 104 may monitor end user activity. Workflow engine 206 may receive and process one or more end user events. Based on the one or more end user events, workflow engine 206 may update each corresponding offer accordingly. As each offer is updated, policy engine 204 may analyze the results of each offer. Accordingly, policy engine 204 may generate a performance metric for each offer. The performance metric may associated with a level of engagement between an end user and a respective offer.

At step 604, organization computing system 104 may identify one or more high performing offers. For example, policy engine 204, based on the monitored end user activity, may identify one or more offers that have the highest level of end user engagement. A high performing offer may be defined as an offer that exceeds a pre-established threshold level of end user engagement.

At step 606, organization computing system 104 may identify one or more low performing offers. For example, policy engine 204, based on the monitored end user activity, may identify one or more offers that have the lowest level of end user engagement. A low performing offer may be defined as an offer that is below a second pre-established threshold level of end user engagement.

At step 608, organization computing system 104 may prompt a client to pause the identified one or more low performing offers. For example, policy engine 204 may make one or more recommendations to client computing system 104, in the form of one or more messages or indications for the client to pause low performing offers. Pausing low performing offers may allow client computing system 102 to transition an end user assigned to a low performing offer to a new offer that may better engage the end user.

At step 610, organization computing system 104 may generate one or more new offers based on end user activity and the identified high performing offers. In some embodiments, policy engine 204 may generate one or more new offers using machine learning module 218. For example, policy engine 204 may generate one or more new offers by inputting one or more streams of end user activity to a machine learning algorithm. The one or more streams of end user activity may include, for example, end user progression of the game corresponding to an offer, as well as the types of user transactions at a facility or organization associated with client computing system 102. In some embodiments, policy engine 204 may generate one or more new offers based on the identified high performing offers. Still further, in some embodiments, policy engine 204 may generate one or more new offers based on a combination of end user activity and identified high performing offers.

At step 612, organization computing system 104 may prompt client computing system 102 to add one or more new offers to the campaign. In some embodiments, orchestration engine 202 may generate one or more recommendation messages to be transmitted to client computing system 102. Each recommendation message may include one or more recommendations to alter or adjust a current campaign. Such adjustments may include adding one or more new offers to the campaign. In some embodiments, such adjustments may include pausing one or more available offers. In some embodiments, such adjustments may include cancelling one or more available offers.

Figure 7:
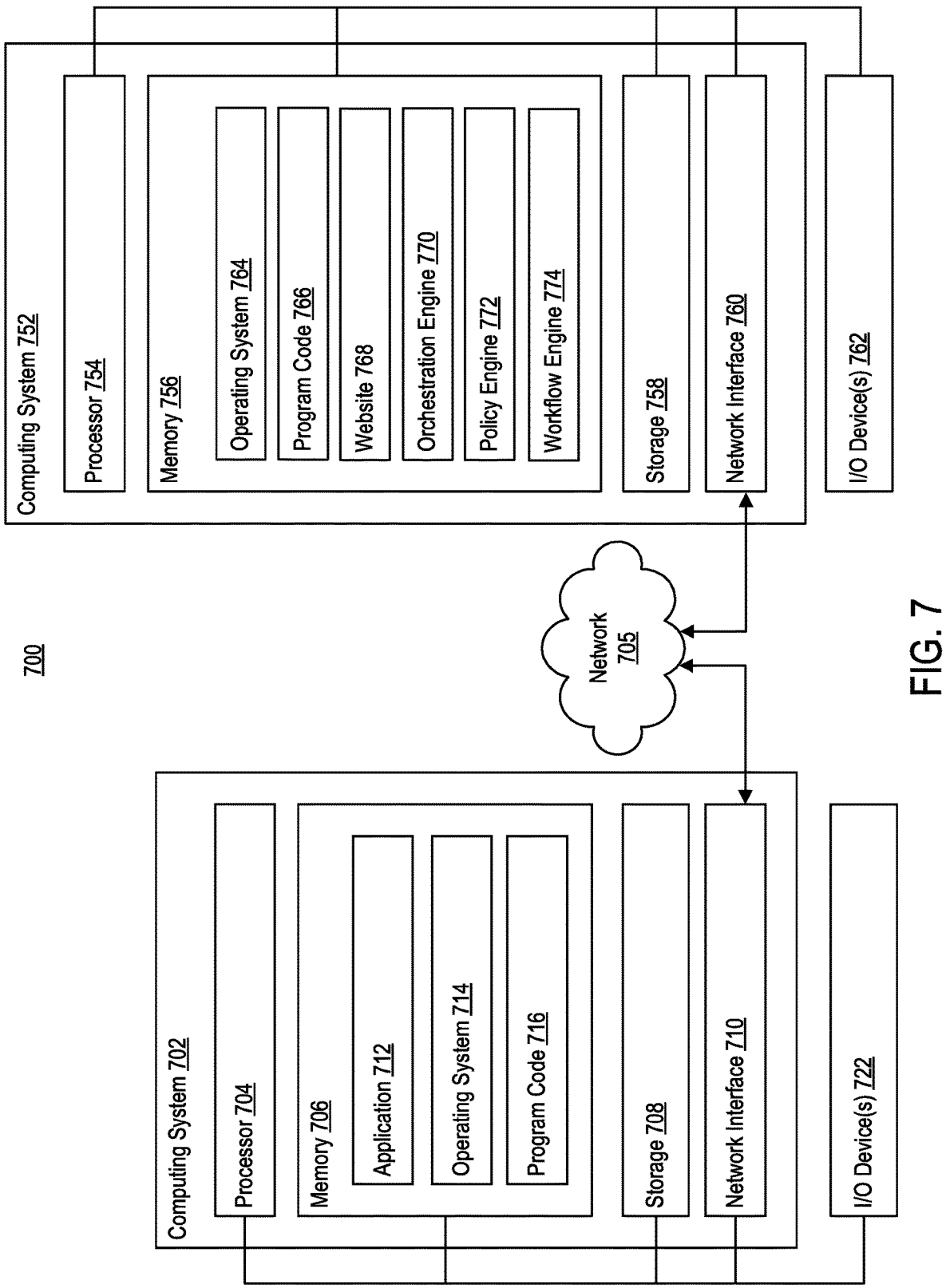
FIG. 7 is a block diagram illustrating a computing environment, according to example embodiments.

FIG. 7 is a block diagram illustrating an exemplary computing environment 700, according to some embodiments. Computing environment 700 includes computing system 702 and computing system 752. Computing system 702 may be representative of client device 101. In some embodiments, computing system 702 may further be representative of administrator device 102. Computing system 752 may be representative of message management system 104.

Computing system 702 may include a processor 704, a memory 706, a storage 708, and a network interface 710. In some embodiments, computing system 702 may be coupled to one or more I/O device(s) 722 (e.g., keyboard, mouse, etc.).

Processor 704 may retrieve and execute program code 716 (i.e., programming instructions) stored in memory 706, as well as stores and retrieves application data. Processor 704 may be included to be representative of a single processor, multiple processors, a single processor having multiple processing cores, and the like. Network interface 710 may be any type of network communications allowing computing system 702 to communicate externally via computing network 705. For example, network interface 710 is configured to enable external communication with computing system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include application 712, operating system 714, and program code 716. Program code 716 may be accessed by processor 704 for processing (i.e., executing program instructions). Program code 716 may include, for example, executable instructions for communicating with computing system 752 to display one or more pages of website 768.

Processor 704 may access application 712 to access functionality of computing system 752. For example, processor 704 may be configured to execute application 712 to manage a client campaign account managed by computing system 752. The content that is displayed to computing system 702 may be transmitted to computing system 702 via application 712, and subsequently processed by application 712 for display through a graphical user interface (GUI) of computing system 702.

Computing system 752 may include a processor 754, a memory 756, a storage 758, and a network interface 760. In some embodiments, computing system 752 may be coupled to one or more I/O device(s) 774. In some embodiments, computing system 752 may be in communication with database 108.

Processor 754 may retrieve and execute program code 766 (i.e., programming instructions) stored in memory 756, as well as stores and retrieves application data. Processor 754 is included to be representative of a single processor, multiple processors, a single processor having multiple processing cores, and the like. Network interface 760 may be any type of network communications enabling computing system 752 to communicate externally via computing network 705. For example, network interface 760 allows computing system 752 to communicate with computing system 702.

Storage 758 may be, for example, a disk storage device. Although shown as a single unit, storage 758 may be a combination of fixed and/or removable storage devices, such as fixed disk drives, removable memory cards, optical storage, network attached storage (NAS), storage area network (SAN), and the like.

Memory 756 may include operating system 764, program code 766, website 768, orchestration engine 770, policy engine 772, and workflow engine 774. Program code 766 may be accessed by processor 454 for processing (i.e., executing program instructions). Program code 766 may include, for example, executable instructions configured to perform steps discussed above in conjunction with FIGS. 3-6. As an example, processor 754 may access program code 766 to generate and manage one or more campaigns. Website 762 may be accessed by computing system 702. For example, website 762 may include content accessed by computing system 702 via a web browser or application.

Orchestration engine 770 may be configured to create and configure one or more campaigns and one or more offers included in each of the one or more campaigns. A campaign may be loosely defined as a collection of offers. Each offer may be referred to as an experience that has been customized or personalized for a given end user. In other words, an offer may define a specific version of an experience, with actions or products, rules, and rewards, with which an end user may engage. An offer may be thought of as a game to be played by end users. A campaign may be distinguished or defined by its objective, its intended audience, and the period of time over which it is improved (or optimized) and delivered to end users. Orchestration engine 770 may be configured to receive input from client computing system 102 to define a campaign's objective, intended audience, and the period of time over which it is improved (or optimized) and delivered to users (i.e., its "activation").

Policy engine 772 may work with orchestration engine 770. For example, while orchestration engine 770 mediates relationships between, campaigns, offers, and end users, policy engine 772 may personalize each assigned offer to each end user and perform real-time analysis on campaign results. Policy engine 772 may be configured to personalize the assigned offer to each particular end user. For example, policy engine 772 may be configured to tailor the offer assigned to a particular end user based on one or more attributes of the user. Policy engine 772 may also continually monitor events and end user statuses to improve (e.g., optimize) end user experience. In other words, policy engine 772 may be configured to continuously perform real-time (or near real-time) analysis of campaign results.

Workflow engine 774 may be configured to manage an interaction between end users and the offers that are assigned thereto. For example, workflow engine 774 may receive, from policy engine 772, one or more offers that are personalized to each respective customer. Workflow engine 774 may, in turn, push each of the one or more personalized offers to each respective customer. In some embodiments, workflow engine 774 may directly interface with application 712 executing on computing system 702. For example, workflow engine 774 may be granted access to application 712 on computing system 702. In some embodiments, workflow engine 774 may transmit each of the one or more personalized offers to computing system 702. Computing system 702 may, in turn, push each of the one or more personalized offers to each respective end user device.

FIG. 8A is a block diagram 800 illustrating a graphical user interface (GUI) 800, according to example embodiments. GUI 800 may be a web page presented in a web browser application (e.g., application 110) of client computing system 102. In some embodiments, GUI 800 may be a graphical user interface generated by a native software application (e.g., application 110) executing on client computing system 102.

As illustrated, GUI 800 may correspond to a graphical user interface generated as a result of a user submitting a campaign creation request. GUI 800 may include a first portion 802 and a second portion 804. First portion 802 of GUI 800 may correspond to a "header" portion of GUI 800. First portion 802 may include one or more graphical elements 806, 808, 810 (e.g., button, link, etc.) selectable by user to cause GUI 800 (e.g., the browser or native application) to send a message to content management service requesting information associated with each graphical element 806-810.

Graphical element 806 may correspond to campaign, offer, end-customer, or system metrics. Accordingly, upon receiving input via graphical element 806, GUI 800 may request from organization computing system 104 results or metrics associated with each campaign of the client. Organization computing system 104 may deliver the one or more results or metrics to GUI 800 so that GUI 800 may display the one or more results or metrics on the display associated with client computing system 102.

Graphical element 808 may correspond to one or more campaigns. Accordingly, upon receiving input via graphical element 808, GUI 800 may request from organization computing system 104 information directed to one or more campaigns associated with client computing system 102. Organization computing system 104 may deliver the one or more campaigns to GUI 800 so that GUI 800 may display the one or more results or metrics on the display associated with client computing system 102. Accordingly, for purposes of FIG. 8, a user of client computing system 104 has requested campaign information.

Graphical element 810 may correspond to one or more offers. Accordingly, upon receiving input via graphical element 810, GUI 800 may request from organization computing system 104 one or more offers associated with a possible campaign. Organization computing system 104 may deliver the one or more offers to GUI 800 so that GUI 800 may display the one or more offers on the display associated with client computing system 102.

Second portion 804 of GUI 800 may include a campaign panel 864. Campaign panel 864 may include one or more campaigns associated with a user account. As shown, each campaign may be represented by graphical element 866. Campaign panel 864 may illustrate one or more attributes of each campaign. For example, campaign panel 864 may illustrate one or more of Campaign ID, Campaign Name, Audience, Campaign Objective, Deployment Date, Expiration, and Status.

In some embodiments, second portion 804 may include a search bar 868 and a graphical element 862. Search bar 868 may be configured to receive, as input, text that may be used to query a database (e.g., database 208) for one or more campaigns associated with the user that satisfy the criteria of the query. Graphical element 862 may represent a "create new campaign" option. Users may interact with graphical element 862 when the users wish to create a new campaign. Selection of graphical element 862 may yield a new screen, such as that discussed below in conjunction with FIG. 8B.

Figure 8B:
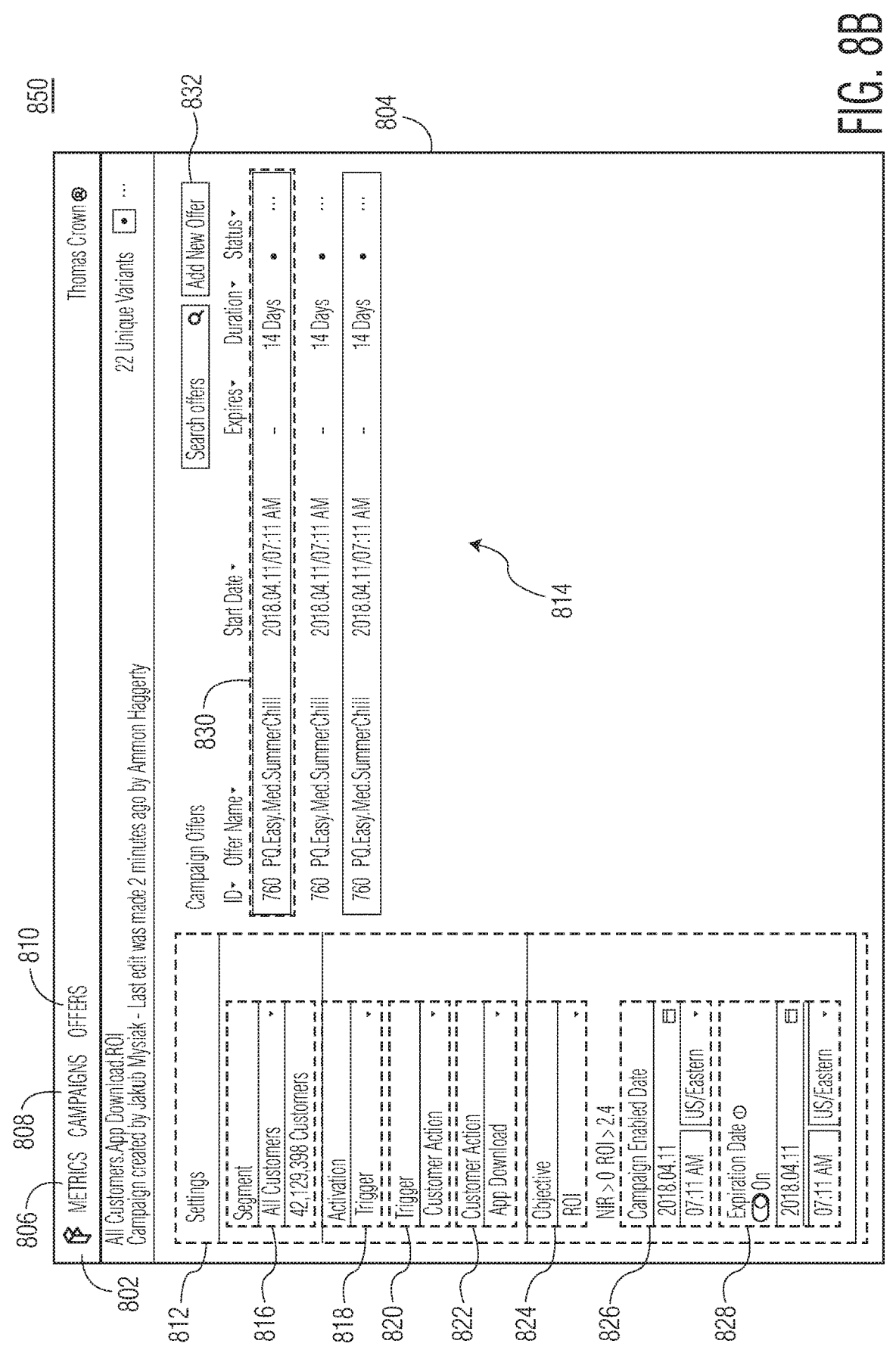

FIG. 8B is a block diagram 850 illustrating a graphical user interface (GUI) 850, according to example embodiments. GUI 850 may be a web page presented in a web browser application (e.g., application 110) of client computing system 102. In some embodiments, GUI 850 may be a graphical user interface generated by a native software application (e.g., application 110).

As illustrated, GUI 850 may correspond to a graphical user interface generated as a result of a user requesting to view one or more campaigns that have been created. GUI 850 may include first portion 802 and a second portion 804. First portion 802 of GUI 850 may correspond to a "header" portion of GUI 850. First portion 802 may include one or more graphical elements 806, 808, 810 (e.g., button, link, etc.) selectable by user to cause GUI 850 (e.g., the browser or native application) to send a message to content management service requesting information associated with each graphical element 806-810.

Second portion 804 of GUI 850 may include a settings panel 812 associated with an offer and a campaign panel 814 displaying one or more parameters of a selected campaign. Settings panel 812 may include one or more graphical elements that allow a client to set one or more parameters associated with the selected campaign. For example, second portion 804 may include graphical elements 816-828.

Graphical element 816 may correspond to a segment defined by client computing system 102. For example, upon clicking an arrow in graphical element 816, a drop down menu may appear, which allows client computing system 102 to select a particular segment of end users. Each segment may be pre-defined by client computing system 102, when client computing system 102 transmits end user information to organization computing system 104 for analysis. Each segment generally represents how client computing system 102 categorizes its end users. Accordingly, upon receiving input via graphical element 816, GUI 800 may request from organization computing system 104 one or more segments associated with client computing system 102. Organization computing system 104 may deliver the one or more segments to GUI 800 so that GUI 800 may display the one or more segments on the display associated with client computing system 102.

Graphical element 818 may correspond to an activation type of the campaign. For example, graphical element 818 may include two or more selectable activation statuses: scheduled activation (e.g., campaign starts on Jan. 1, 2019) or trigged activation (e.g., campaign starts when customer downloads an application). As shown, the activation type selected is a trigger activation type.

Graphical element 820 may correspond to a trigger type. For example, graphical element 820 may include one or more selectable trigger types, such as, but not limited to, downloading of an application. As shown, the selected user type is customer action.

Graphical element 822 may correspond to a customer action type. For example, graphical element 822 may include one or more selectable trigger types: application download, store visit, particular item purchase, item type purchase, minimum amount of purchase, and the like. As shown, the selected customer action type is "app download."

Graphical element 824 may correspond to a campaign objective. For example, graphical element 820 may include one or more selectable objectives: NIR, ROI, and Completion. Accordingly, upon receiving input via graphical element 820, GUI 800 may request that organization computing system 104 update an objective of the campaign accordingly. Organization computing system 104 may deliver a confirmation of updated the objective of the campaign to GUI 800 so that GUI 800 may display the updated objective on the display associated with client computing system 102.

Graphical element 826 may correspond to a campaign enabled date. Accordingly, upon receiving input via graphical element 826, GUI 800 may inform organization computing system 104 of the desired campaign enabled date.

Graphical element 828 may correspond to an optional expiration date. Accordingly, upon receiving input via graphical element 828, GUI 800 may inform organization computing system 104 of the desired campaign expiration date, if any.

Campaign panel 814 may display one or more offers currently assigned to the campaign. For example, campaign panel 814 may include one or more graphical elements 830. Each graphical element 830 may correspond to a given offer. Each graphical element 830 may display one or more attributes of a respective offer. For example, graphical element 830 may include information directed to: Offer ID, Offer Name, Offer Start Date, Offer Expiration Date, Offer Duration, and Offer Status.

Campaign panel 814 may further include graphical element 832. Graphical element 832 may correspond to a request to add an offer to the campaign. Accordingly, upon receiving input via graphical element 832, GUI 800 may request from organization computing system 104 one or more offers that may be added to the campaign based on the campaign parameters provided in settings panel 812. Organization computing system 104 may deliver an updated GUI (see FIG. 9) that may display the one or more offers on the display associated with client computing system 102.

Figure 9:
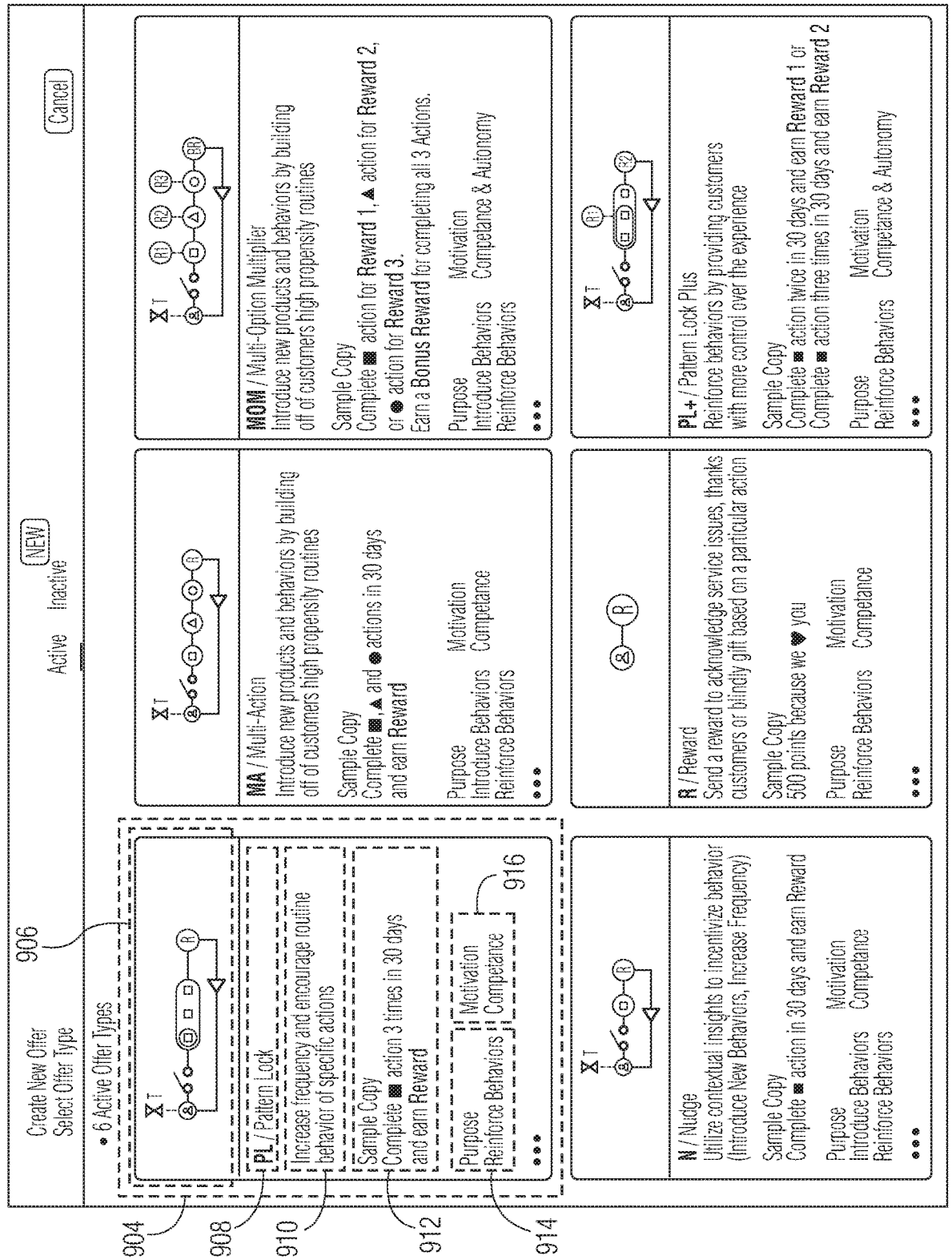
FIG. 9 is a block diagram illustrating a graphical user interface, according to example embodiments.

FIG. 9 is a block diagram 900 illustrating a graphical user interface (GUI) 900, according to example embodiments. GUI 900 may be a web page presented in a web browser application (e.g., application 110) of client computing system 102. In some embodiments, GUI 900 may be a graphical user interface generated by a native software application (e.g., application 110) executing on client computing system 102.

As illustrated, GUI 900 may correspond to a graphical user interface generated as a result of GUI 850 receiving input to add an offer to a campaign. GUI 900 may include one or more graphical elements 904. Each graphical element 904 may correspond to a particular offer type that may be added to a campaign. For example, as illustrated, the one or more offer types may be: Pattern Lock, Multi-Action, Multi-Option Multiplier, Nudge, Reward, Pattern Lock Plus, and the like.

Each graphical element 904 may include one or more sub-graphical elements 906-916. Each graphical element 906 may correspond to a graphic for the particular offer type. In some embodiments, each graphical element may be color-coded. Each graphical element 908 may correspond to a title of the offer type. Each graphical element 910 may correspond to a description of the corresponding offer type. Each graphical element 912 may correspond to a sample of the particular offer type. Graphical element 914 may correspond to a description of the purpose of the offer type. Graphical element 916 may correspond to a description of the motivation of the offer type. Accordingly, GUI 900 may provide users with the minimum amount of information necessary for the user to make a learned decision about which offer type to choose.

FIG. 10 is a block diagram 1000 illustrating a graphical user interface (GUI) 1000, according to example embodiments. GUI 1000 may be a web page presented in a web browser application (e.g., application 110) of client computing system 102. In some embodiments, GUI 1000 may be a graphical user interface generated by a native software application (e.g., application 110) executing on client computing system 102.

As illustrated, GUI 1000 may correspond to a graphical user interface generated as a result of GUI 1000 receiving input to view one or more offers of a campaign. GUI 1000 may include a filter panel 1006 and a results panel 1008. Filter panel 1006 may include one or more graphical elements 1010-1020.

Graphical element 1010 may correspond to one or more offer types. For example, graphical element 1010 may allow the user to check or uncheck one or more offer types, such that offers in results panel 1008 may be filtered. Exemplary offer types may include, but are not limited to, a multi-option multiplier offer type, scratcher offer type, a visit offer type, pattern lock offer type, loop offer type, bonus offer type, choose-your-own adventure offer type, and the like.

Graphical element 1012 may correspond to an offer duration. For example, graphical element 1012 may allow the user to submit a desired duration for offers. Accordingly, upon receiving input via graphical element 1012, GUI 1000 may request that organization computing system 104 filter the available offers according to the inputted duration. Organization computing system 104 may deliver a filtered list of offers to GUI 1000 so that GUI 1000 may display the filtered list of offers on the display associated with client computing system 102.

Graphical element 1014 may correspond to a number of hurdles. For example, graphical element 1014 may allow the user to submit a minimum number of hurdles and/or a maximum number of hurdles for each offer. Accordingly, upon receiving input via graphical element 1014, GUI 1000 may request that organization computing system 104 filter the available offers according to the inputted parameters. Organization computing system 104 may deliver a filtered list of offers to GUI 1000 so that GUI 1000 may display the filtered list of offers on the display associated with client computing system 102.

Graphical element 1016 may correspond to an offer creation. For example, graphical element 1016 may allow the user to filter offers based on a date the offer was created. Accordingly, upon receiving input via graphical element 1016, GUI 1000 may request that organization computing system 104 filter the available offers according to the inputted creation date. Organization computing system 104 may deliver a filtered list of offers to GUI 1000 so that GUI 1000 may display the filtered list of offers on the display associated with client computing system 102.

Graphical element 1018 may correspond to an expiration date of the offer. For example, graphical element 1018 may allow the user to filter offers based on when the offer with terminate (or expire). Accordingly, upon receiving input via graphical element 1018, GUI 1000 may request that organization computing system 104 filter the available offers according to the inputted expiration date. Organization computing system 104 may deliver a filtered list of offers to GUI 1000 so that GUI 1000 may display the filtered list of offers on the display associated with client computing system 102.

Graphical element 1020 may correspond to a status of the offer. For example, graphical element 1020 may allow the user to filter offers based on whether the offer is live or schedule to be live. Accordingly, upon receiving input via graphical element 1020, GUI 1000 may request that organization computing system 104 filter the available offers according to the offer status. Organization computing system 104 may deliver a filtered list of offers to GUI 1000 so that GUI 1000 may display the filtered list of offers on the display associated with client computing system 102.

Results panel 1008 may be configured to display one or more available offers to client computing system 102. For example, results panel 1008 may be configured to display one or more offers that client computing system 102 may add to a given campaign. Results panel 1008 may be dynamically updated based on information provided in filter panel 1006. Accordingly, results panel 1008 may update to satisfy one or more constraints submitted by client computing system 102.

Results panel 1008 may include one or more offer entries 1024 and graphical element 1028. Each offer entry 1024 may correspond to an available offer that satisfies one or more constraints defined in filter panel 1006. Each offer entry 1024 may include graphical element 1026. Graphical element 1026 may take the form of an edit box. Upon selection of graphical element 1026, user may be led to a new graphical user interface that allows the user to update the respective offer.

GUI 1000 may further include information panel 1009. Information panel 1009 may be generated upon selection of an offer entry 1024. For example, upon selection of an offer entry 1024, GUI 1000 may update to illustrate information panel 1009. Information panel 1009 may include information associated with the selected offer entry. As illustrated, information panel 1009 may include metadata associated with the offer (e.g., channels, offer duration, expiration, creation date, etc.), one or more hurdles associated with the offer, one or more rewards associated with each hurdle or completion of all hurdles, and the like.

Figure 11A:
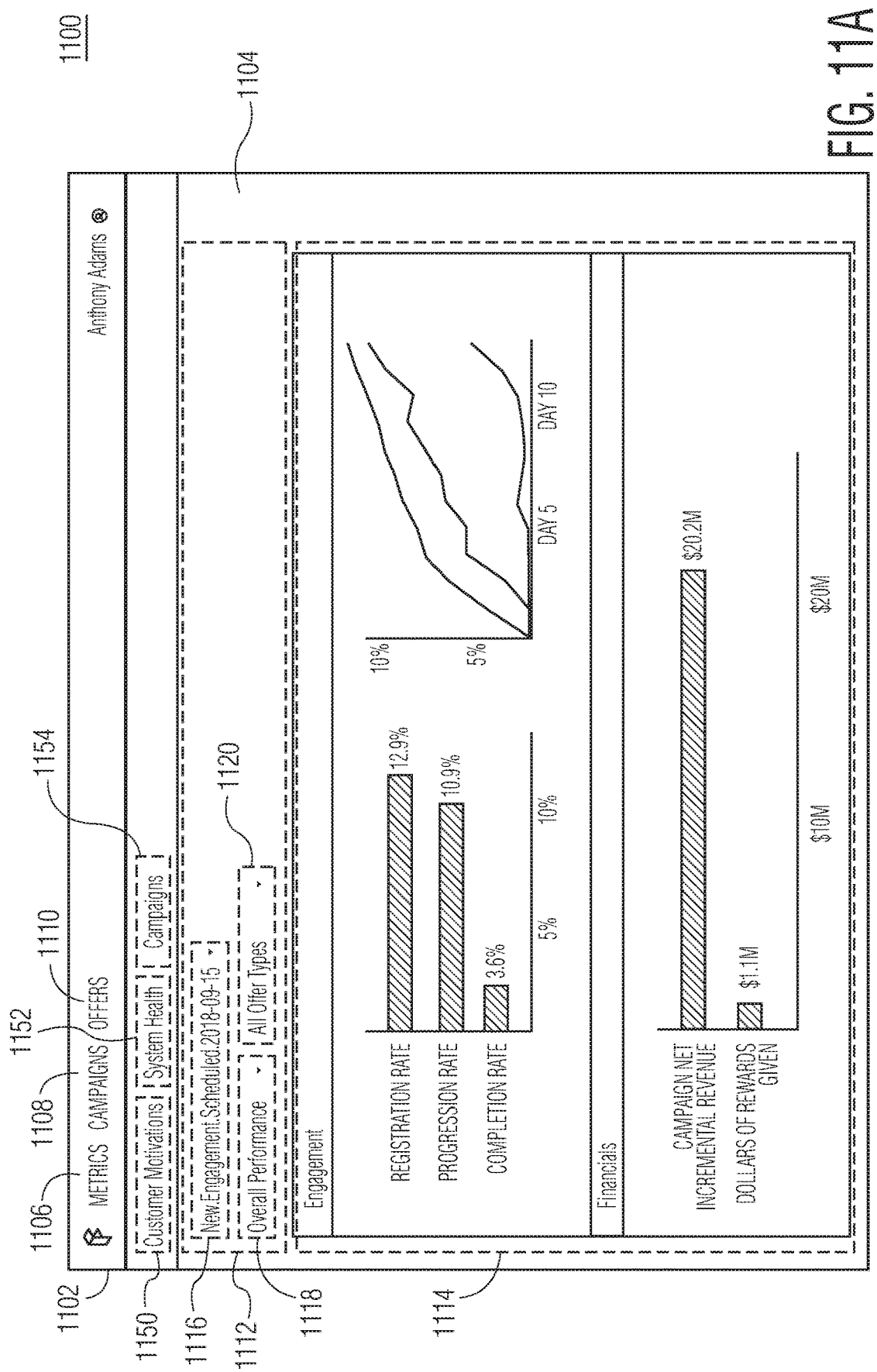
FIG. 11A is a block diagram illustrating a graphical user interface, according to example embodiments.

FIG. 11A is a block diagram 1100 illustrating a graphical user interface (GUI) 1000, according to example embodiments. GUI 1100 may be a web page presented in a web browser application (e.g., application 110) of client computing system 102. In some embodiments, GUI 1100 may be a graphical user interface generated by a native software application (e.g., application 110) executing on client computing system 102.

As illustrated, GUI 1100 may correspond to a graphical user interface generated as a result of a user submitting a request to view results associated with a campaign. GUI 1100 may include a first portion 1102 and a second portion 1104. First portion 1102 of GUI 1100 may correspond to a "header" portion of GUI 1100. First portion 1102 may include one or more graphical elements 1106, 1108, 1110 (e.g., button, link, etc.) selectable by user to cause GUI 1100 (e.g., the browser or native application) to send a message to content management service requesting information associated with each graphical element 1106-1110.

Graphical element 1106 may correspond to campaign, offer, end-customer, or system metrics. Accordingly, upon receiving input via graphical element 1106, GUI 1100 may request from organization computing system 104 results or metrics associated with each campaign of the client. Organization computing system 104 may deliver the one or more results or metrics to GUI 1100 so that GUI 1100 may display the one or more results or metrics on the display associated with client computing system 102. Accordingly, for purposes of FIG. 11, a user of client computing system 102 has requested metrics. When metrics is selected, the user is prompted with one or more sub-options 1150-1154. Sub-option 1150 allows users to view customer motivations. Sub-option 1152 allows users to view system health metrics. Sub-option 1154 allows users to view campaign metrics. In FIG. 11, user has selected sub-option 1154.

Graphical element 1108 may correspond to one or more campaigns. Accordingly, upon receiving input via graphical element 1108, GUI 1100 may request from organization computing system 104 information directed to one or more campaigns associated with client computing system 102. Organization computing system 104 may deliver the one or more campaigns to GUI 1100 so that GUI 1100 may display the one or more results or metrics on the display associated with client computing system 102.

Graphical element 1110 may correspond to one or more offers. Accordingly, upon receiving input via graphical element 1110, GUI 1100 may request from organization computing system 104 one or more offers associated with a possible campaign. Organization computing system 104 may deliver the one or more offers to GUI 1100 so that GUI 1100 may display the one or more offers on the display associated with client computing system 102.

Second portion 1104 of GUI 1100 may include a selection panel 1112 and a second panel 1114. First panel 1112 may include one or more graphical elements 1116, 1118, and 1120. Graphical element 1116 may be representative of a dropdown bar that allows users to select a campaign for which to view results. As illustrated, the user has selected "New.Engagement.Scheduled.2018-09-15." Graphical element 1118 may be representative of a dropdown bar that allows user to select a particular metric associated with the selected campaign to view. Exemplary metrics may include, but are not limited to, Overall Performance, Performance by offer. Graphical element 1120 may be representative of a dropdown bar that allows users to narrow the types of offers to view.

Second panel 1114 may include one or more graphical representations visually illustrating the particular metrics defined above in first panel 1112. As illustrated, second panel 1114 may include several charts related to Customer Engagement and Financials.

Figure 11B:
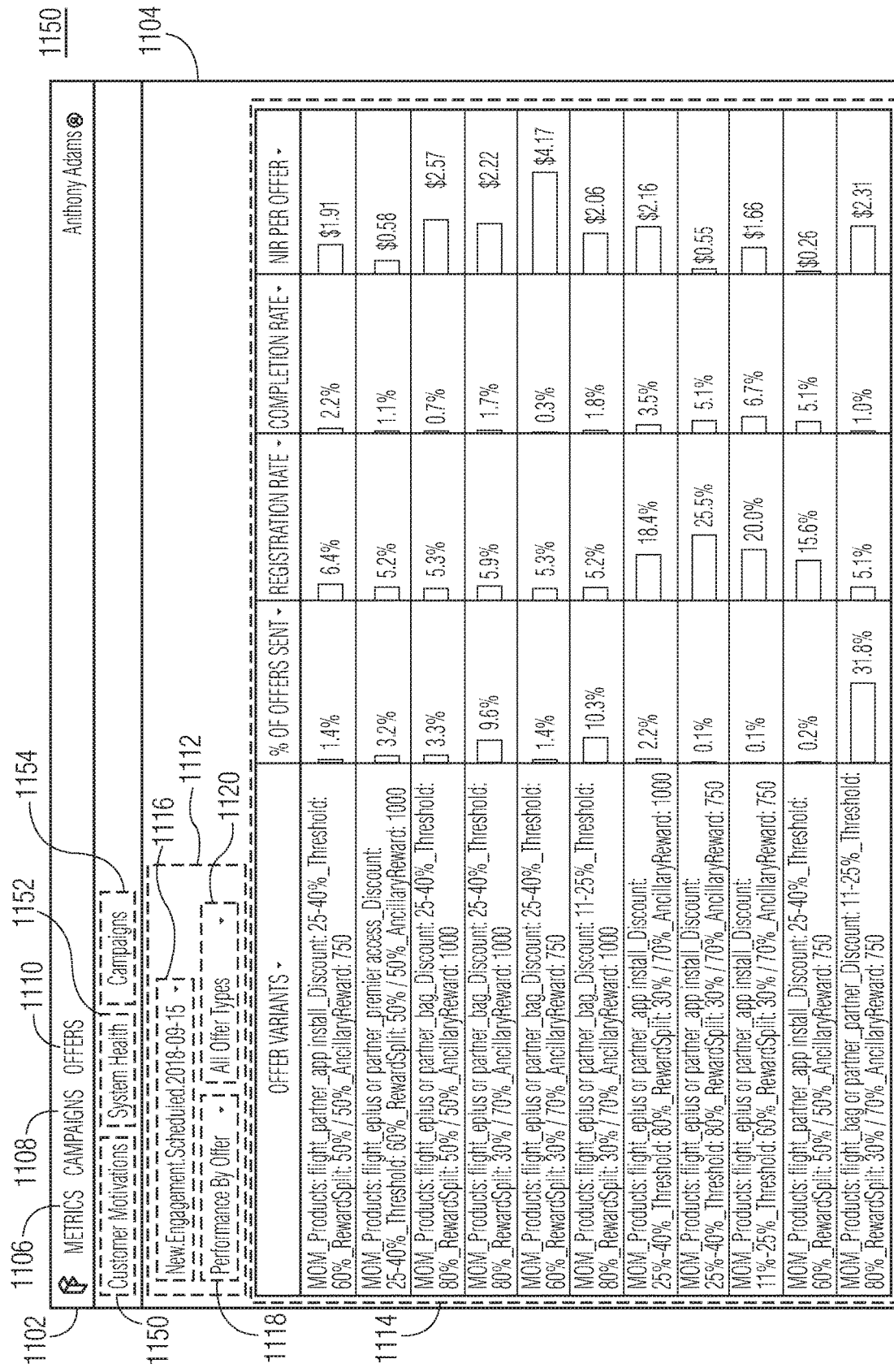
FIG. 11B is a block diagram illustrating a graphical user interface, according to example embodiments.

FIG. 11B is a block diagram illustrating a graphical user interface (GUI) 1150, according to example embodiments. GUI 1150 may be similar to GUI 1100. GUI 1150 may be a web page presented in a web browser application (e.g., application 110) of client computing system 102. In some embodiments, GUI 1150 may be a graphical user interface generated by a native software application (e.g., application 110) executing on client computing system 102. GUI 1150 may represent information displayed to a user when a user selects "Performance By Offer" option in graphical element 1118.

When "Performance by Offer" option is selected, second panel 1114 may be populated with performance metrics on a per offer basis. As illustrated, GUI 1150 may include metrics associated with each offer of "New.Engagement.Scheduled.2018-09-15" campaign. For example, each offer may include metrics directed to "% of offers sent," "registration rate," "completion rate," and "NIR per offer."

Figure 12:
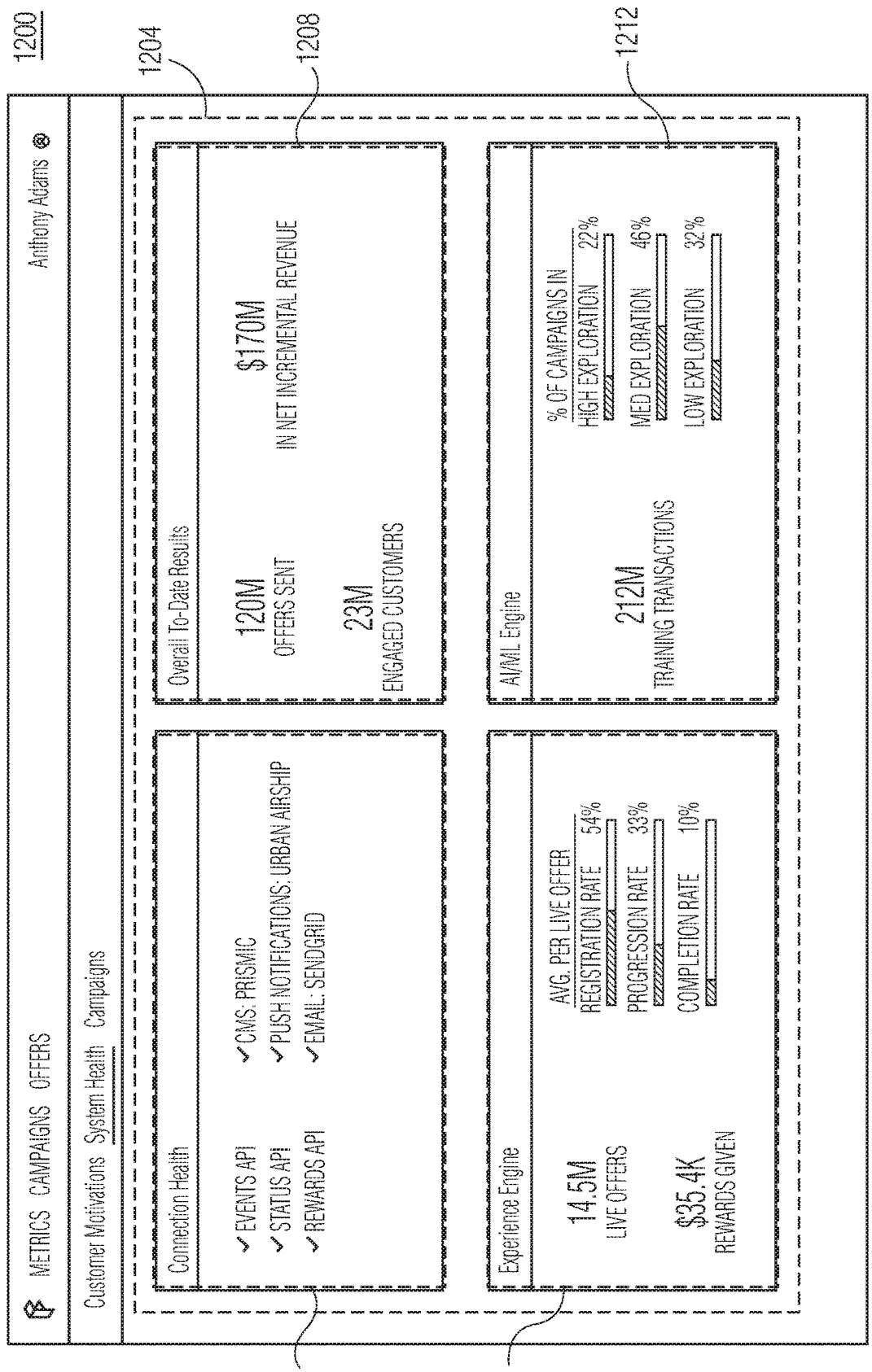
FIG. 12 is a block diagram illustrating a graphical user interface, according to example embodiments.

FIG. 12 is a block diagram illustrating a graphical user interface (GUI) 1200, according to example embodiments. GUI 1200 may be a web page presented in a web browser application (e.g., application 110) of client computing system 102. In some embodiments, GUI 1200 may be a graphical user interface generated by a native software application (e.g., application 110) executing on client computing system 102. GUI 1200 may be representative of information generated for a user when a user selects "System Health" option.

GUI 1200 may include health panel 1204. Health panel 1204 may illustrate one or more metrics associated with the health of the system. As illustrated, health panel 1204 may include graphical elements 1206-1212. Graphical element 1206 may be representative of connection health metrics. Graphical element 1208 may be representative of overall to-date results of a campaign. Graphical element 1220 may be representative of experience engine metrics. Graphical element 1222 may be representative of artificial intelligence/machine learning engine health.

FIG. 13 is a block diagram illustrating a graphical user interface (GUI) 1300, according to example embodiments. GUI 1300 may be a web page presented in a web browser application (e.g., application 110) of client computing system 102. In some embodiments, GUI 1300 may be a graphical user interface generated by a native software application (e.g., application 110) executing on client computing system 102. GUI 1200 may be representative of information generated for a user when a user selects "Customer Motivations" option.

GUI 1300 may include panel 1304. Panel 1304 may include one or more graphical elements 1306-1310. Graphical element 1306 may represent a dropdown menu that allows user to select a way to view metrics associated with customer motivations. For example, graphical element 1306 may allow end users to select: motivation map, construct map, motivations by customer, etc. Graphical element 1308 may represent a dropdown menu that allows users to define a duration in which to view the customer motivations metrics. As illustrated, the user selected "Last 5 Months." Graphical element 1310 may represent a dropdown menu that allows user to select one or more groups of customers. For example, graphical element 1310 may allow users to select all audiences (e.g., segments) that have been configured for the client. As illustrated, the user selected "All Audiences."

Panel 1304 may further include one or more graphical elements 1312-1324 that illustrate metrics associated with the entered information. Graphical element 1312 may represent a total number of customers in the selected groups of customers. Graphical element 1314 may represent a number of campaigns associated with the defined constraints. Graphical element 1316 may represent the total offer constructs associated with the defined constraints. Graphical element 1318 may represent one or more metrics associated with autonomy. Graphical element 1320 may represent one or more metrics associated with social relatedness. Graphical element 1322 may represent one or more metrics associated with competence. Graphical element 1324 may represent the motivation map. Motivation map may illustrate one or more characteristics of human motivations, and illustrate how well the current offers work on those motivations. For example, mind map may show how challenging the offers are for customers who are motivated by meeting challenges.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A system for customizing an end user gaming experience, comprising:
   a processor in communication with a client computing system and one or more end user devices, the processor configured to:
   create a campaign by:
   receiving a campaign creation request from an end user device, the campaign creation request comprising one or more parameters of the campaign associated with the campaign creation request;
   creating the campaign based on the one or more parameters associated with the campaign creation request;
   personalizing one or more offers for an end user, each of the one or more offers comprising a game having one or more hurdles, wherein completion of each of the one or more hurdles leads to a reward; and
   mapping a subset of the one or more personalized offers to the end user; and
   monitor progress of the campaign, by:
   pushing the one or more personalized offers to each respective end user device;
   monitoring each end user's progression in a respective game; and
   updating each user's progression in the respective game.

2. The system of claim 1, wherein the one or more parameters comprise a campaign objective.

3. The system of claim 1, wherein the campaign creation request further comprises end user descriptive attributes.

4. The system of claim 3, wherein mapping the subset of the one or more personalized offers to the end user, comprises:
   mapping each of the subset of the one or more offers to the end user based on the end user descriptive attributes using a machine learning algorithm.

5. The system of claim 3, wherein personalizing each of the one or more offers based on the end user to which each of the one or more offers was mapped, comprises:
   personalizing each of the one or more offers based on the end user descriptive attributes.

6. The system of claim 1, wherein monitoring each end user's progression in the respective game, comprises:
   receiving, by an orchestration engine, one or more streams of end user transaction data, wherein the one or more streams of end user transaction data comprises transactions occurring at a facility or organization associated with the client computing system; and
   for each end user transaction in the one or more streams of end user transaction data, identifying whether each transaction satisfies a hurdle in the game.

7. The system of claim 1, wherein the processor is further configured to generate one or more new offers based on each end user's progression in the respective game using a machine learning model.

8. The system of claim 7, wherein the processor is further configured to:
   identify a further subset of the one or more offers that exceed a threshold engagement level; and
   assigning the further subset of the one or more offers that exceed the threshold engagement level to additional end users.

9. A method of customizing end user gaming experience, comprising:
   initiating, by an organization computing system, a campaign comprising one or more offers, each offer corresponding to a personalized game to be played by each end user device, wherein upon completion of one or more hurdles in the personalized game, each end user device receives a reward;
   receiving, by the organization computing system from a client computing system, one or more streams of end user transaction data comprising one or more transactions at a facility or organization associated with the client computing system;

analyzing, by the organization computing system, each of the one or more transactions to identify which transactions triggered completion of a hurdle for each end user device;
monitoring, by the organization computing system, each end user's progress in the personalized game; and
based on the monitoring, generating, by the organization computing system, one or more new versions of machine learning models, the one or more new versions of machine learning models configured to assign the one or more offers to one or more end users and personalize each of the one or more offers for each end user.

10. The method of claim 9, wherein initiating, by the organization computing system, the campaign comprising the one or more offers, comprises:
mapping the one or more offers to an end user computing device, each of the one or more offers.

11. The method of claim 10, further comprising:
personalizing each of the one or more offers based on the end user computing device to which each of the one or more offers was mapped.

12. The method of claim 9, wherein each personalized game is personalized based on end user attribute information associated with each respective end user computing device.

13. The method of claim 9, further comprising:
based on the monitoring, pausing, by the organization computing system, user of previous machine learning models.

14. A non-transitory computer readable medium having instructions stored thereon, which, when executed by a processor, cause the processor to perform a method of customizing end user gaming experience, comprising:
receiving a campaign creation request from a client computing system, the campaign creation request comprising one or more parameters of a campaign associated with the campaign creation request;
creating the campaign based on the one or more parameters associated with the campaign creation request;
personalizing one or more offers for an end user of one or more end users, each of the one or more offers comprising a game having one or more hurdles, wherein completion of each of the one or more hurdles leads to a reward;
mapping a subset of the one or more personalized offers to each end user;
pushing the one or more personalized offers to each respective end user device;
monitoring each end user's progression in a respective game; and
updating each user's progression.

15. The non-transitory computer readable medium of claim 14, wherein the one or more parameters comprises a campaign objective.

16. The non-transitory computer readable medium of claim 14, wherein the campaign creation request further comprises end user attribute information.

17. The non-transitory computer readable medium of claim 16, wherein mapping the subset of the one or more offers to the end user, comprises:
mapping each of the subset of the one or more offers to the end user based on the end user attribute information using a machine learning algorithm.

18. The non-transitory computer readable medium of claim 16, wherein personalizing each of the one or more offers, comprises:
personalizing each of the one or more offers based on the end user attribute information.

19. The non-transitory computer readable medium of claim 14, wherein monitoring each end user's progression in a respective offer, comprises:
receiving one or more streams of end user transaction data, wherein the one or more streams of end user transaction data comprises transactions occurring at a facility or organization associated with the client computing system; and
for each end user transaction in the one or more streams of end user transaction data, identifying whether each transaction satisfies a hurdle in the game.

20. The non-transitory computer readable medium of claim 14, wherein the method further comprises:
generating one or more new offers based on each end user's progression in the respective game using a machine learning model by:
identifying a further subset of the one or more offers that exceed a threshold engagement level; and
creating the one or more new offers based on variants of the further subset of the one or more offers that exceed the threshold engagement level.

* * * * *